United States Patent
Eschbach et al.

(10) Patent No.: US 10,447,761 B2
(45) Date of Patent: Oct. 15, 2019

(54) METHOD AND SYSTEM FOR CAPTURING WEB CONTENT FROM A WEB SERVER AS A SET OF IMAGES

(71) Applicants: Jeffrey T Eschbach, Chicago, IL (US); Todd Walter Price, Prairie Grove, IL (US); Stephen Gregory Nazaran, Oak Park, IL (US)

(72) Inventors: Jeffrey T Eschbach, Chicago, IL (US); Todd Walter Price, Prairie Grove, IL (US); Stephen Gregory Nazaran, Oak Park, IL (US)

(73) Assignee: PAGE VAULT INC., Chicago, IL (US)

( * ) Notice: Subject to any disclaimer, the term of this patent is extended or adjusted under 35 U.S.C. 154(b) by 760 days.

(21) Appl. No.: 14/815,638

(22) Filed: Jul. 31, 2015

(65) Prior Publication Data
US 2017/0034244 A1     Feb. 2, 2017

(51) Int. Cl.
*H04L 29/08* (2006.01)
*H04L 29/06* (2006.01)

(52) U.S. Cl.
CPC ............ *H04L 67/025* (2013.01); *H04L 67/02* (2013.01); *H04L 67/06* (2013.01); *H04L 67/14* (2013.01); *H04L 67/42* (2013.01)

(58) Field of Classification Search
CPC ....... G06F 17/30861–30905; H04L 67/02–025
See application file for complete search history.

(56) References Cited

U.S. PATENT DOCUMENTS 5,781,629 A     7/1998    Haber et al.
5,809,250 A *   9/1998    Kisor ................ G06F 17/30873
                                                        707/E17.111
(Continued)

FOREIGN PATENT DOCUMENTS

CN    102355459 A    2/2012
GB      2478554 A    9/2011
(Continued)

OTHER PUBLICATIONS

Rao, Herman Chung-Hwa, Yih-Farn Chen, and Ming-Feng Chen. "A proxy-based personal web archiving service." ACM SIGOPS Operating Systems Review 35.1 (2001): 61-72.*
(Continued)

*Primary Examiner* — Mahran Y Abu Roumi
(74) *Attorney, Agent, or Firm* — Nolte Intellectual Property Law Group

(57) ABSTRACT

A method and system for capturing web content from a web server includes a capturing server establishing an active link between a client device and the capturing server that allows the client device to remotely control an active web browsing session, between the capturing server and the web server, to select web content. The method also includes establishing the active web browsing session between the capturing server and the web server using a web browser executing on the capturing server. The capturing server further receives the web content from the web server, without the web content being routed through the client device, and captures the web content during the active web browsing session as a set of images of the web browser. The set of images is captured to a non-volatile storage device, remote from the client device, for later retrieval on a future date.

19 Claims, 18 Drawing Sheets

(56) References Cited

U.S. PATENT DOCUMENTS

| | | |
|---|---|---|
| 6,356,934 B1 | 3/2002 | Delph |
| 6,571,256 B1 * | 5/2003 | Dorian .............. G06F 17/30876 707/915 |
| 6,792,545 B2 | 9/2004 | Mccreight et al. |
| 7,370,035 B2 | 5/2008 | Gross et al. |
| 7,424,510 B2 | 9/2008 | Gross et al. |
| 7,496,559 B2 | 2/2009 | Gross et al. |
| 7,693,956 B2 | 4/2010 | Moricz |
| 7,899,829 B1 * | 3/2011 | Malla ............... G06F 17/30884 707/741 |
| 7,945,914 B2 | 5/2011 | Hasiuk et al. |
| 7,966,350 B2 | 6/2011 | Levine et al. |
| 8,019,741 B2 | 9/2011 | Gross et al. |
| 8,037,182 B2 | 10/2011 | Smyth et al. |
| 8,065,414 B2 | 11/2011 | Anastas et al. |
| 8,171,108 B2 | 5/2012 | Shannon et al. |
| 8,566,903 B2 | 10/2013 | Kisin et al. |
| 8,881,048 B2 * | 11/2014 | Bakhash ............ G06F 3/04815 715/782 |
| 8,984,390 B2 * | 3/2015 | Aymeloglu ......... G06F 17/2288 715/207 |
| 9,213,777 B2 * | 12/2015 | Chan .................. G06F 17/2247 |
| 9,349,134 B1 * | 5/2016 | Adams .................... G06F 21/53 |
| 9,391,832 B1 * | 7/2016 | Song ....................... H04L 29/14 |
| 9,489,385 B1 * | 11/2016 | Ladola ............... G06F 17/30073 |
| 9,729,410 B2 * | 8/2017 | Eschbach ................ H04L 43/04 |
| 2001/0047400 A1 | 11/2001 | Coates et al. |
| 2002/0038388 A1 * | 3/2002 | Netter ...................... G06F 9/451 719/318 |
| 2002/0071192 A1 | 6/2002 | Deblanc et al. |
| 2002/0112020 A1 * | 8/2002 | Fisher ............... G06F 17/30902 709/215 |
| 2002/0129114 A1 * | 9/2002 | Sundaresan ........... G06F 3/0481 709/213 |
| 2002/0198882 A1 | 12/2002 | Linden et al. |
| 2003/0023664 A1 | 1/2003 | Elmer |
| 2003/0132957 A1 * | 7/2003 | Ullmann ............ G06F 17/30873 715/738 |
| 2003/0200550 A1 | 10/2003 | Antebi et al. |
| 2004/0034647 A1 * | 2/2004 | Paxton .............. G06F 17/30876 |
| 2004/0260733 A1 | 12/2004 | Adelstein et al. |
| 2005/0102279 A1 * | 5/2005 | Watanabe ........... G06F 17/3089 |
| 2005/0108259 A1 * | 5/2005 | Watanabe ........... G06F 17/3089 |
| 2005/0144315 A1 | 6/2005 | George et al. |
| 2005/0203882 A1 * | 9/2005 | Godley ............. G06F 17/30887 |
| 2007/0011450 A1 | 1/2007 | McCreight et al. |
| 2007/0022296 A1 | 1/2007 | Caverly et al. |
| 2008/0016539 A1 * | 1/2008 | Na ...................... H04N 21/4122 725/105 |
| 2008/0240613 A1 * | 10/2008 | Dietz ................... G02B 21/367 382/284 |
| 2009/0036190 A1 * | 2/2009 | Brosnan ................ G07F 17/32 463/16 |
| 2009/0089361 A1 | 4/2009 | Womack et al. |
| 2009/0132640 A1 | 5/2009 | Verma et al. |
| 2009/0165142 A1 | 6/2009 | Adelstein et al. |
| 2009/0204610 A1 | 8/2009 | Hellstrom et al. |
| 2009/0299887 A1 * | 12/2009 | Shiran .................... G06Q 30/02 705/35 |
| 2009/0307571 A1 * | 12/2009 | Gowda ................... G06F 17/30 715/202 |
| 2009/0307603 A1 * | 12/2009 | Gowda ................ H04L 67/2823 715/749 |
| 2010/0057864 A1 | 3/2010 | Laird-McConnell |
| 2010/0082682 A1 * | 4/2010 | Kinoshita ........... G06F 17/3089 707/784 |
| 2010/0083179 A1 * | 4/2010 | Decker ................. G06F 3/0483 715/830 |
| 2010/0095208 A1 * | 4/2010 | White ............... G06F 17/30905 715/704 |
| 2010/0202755 A1 * | 8/2010 | Ariya ................... G11B 27/034 386/291 |
| 2011/0041058 A1 | 2/2011 | Butler et al. |
| 2011/0087769 A1 * | 4/2011 | Holmes .................. G06Q 30/00 709/224 |
| 2011/0131276 A1 * | 6/2011 | Cadou ................. H04L 12/1831 709/204 |
| 2011/0221766 A1 * | 9/2011 | Ko ........................ G06F 3/1208 345/629 |
| 2011/0234750 A1 * | 9/2011 | Lai ........................ G03B 37/04 348/37 |
| 2011/0264677 A1 | 10/2011 | Hermitage et al. |
| 2011/0264709 A1 * | 10/2011 | Beardsmore .......... G06F 9/4443 707/804 |
| 2012/0010995 A1 * | 1/2012 | Skirpa .................. G06F 3/0481 705/14.49 |
| 2012/0173966 A1 * | 7/2012 | Powell ............... G06Q 30/0241 715/234 |
| 2012/0221633 A1 | 8/2012 | Adelstein et al. |
| 2012/0265802 A1 * | 10/2012 | Shen ....................... H04L 67/02 709/203 |
| 2012/0290847 A1 | 11/2012 | O'Connor et al. |
| 2012/0303607 A1 | 11/2012 | Moricz et al. |
| 2013/0019149 A1 * | 1/2013 | Spencer ............. G06F 17/30864 715/202 |
| 2013/0055114 A1 * | 2/2013 | Lev ........................ G06F 16/954 715/760 |
| 2013/0132833 A1 * | 5/2013 | White ...................... G06F 3/048 715/704 |
| 2013/0133032 A1 | 5/2013 | Li et al. |
| 2013/0166777 A1 | 6/2013 | Chen et al. |
| 2013/0212689 A1 | 8/2013 | Ben-Natan et al. |
| 2013/0254845 A1 | 9/2013 | Soerensen |
| 2014/0019534 A1 * | 1/2014 | Handrigan ................ G06F 9/54 709/204 |
| 2014/0053061 A1 * | 2/2014 | Chasen ............... G06F 17/2247 715/234 |
| 2014/0089786 A1 * | 3/2014 | Hashmi ............... G06F 17/2247 715/234 |
| 2014/0118479 A1 * | 5/2014 | Rapoport ............ H04N 1/00183 348/36 |
| 2014/0136944 A1 * | 5/2014 | Harris ..................... G06F 17/211 715/234 |
| 2014/0173414 A1 * | 6/2014 | Chan .................... G06F 17/3089 715/234 |
| 2014/0173417 A1 | 6/2014 | He |
| 2014/0214919 A1 * | 7/2014 | Taylor ................. H04L 67/2814 709/203 |
| 2014/0304588 A1 * | 10/2014 | Li ...................... G06F 17/30905 715/234 |
| 2015/0007024 A1 * | 1/2015 | Jeong .................... G06F 17/211 715/277 |
| 2015/0082460 A1 * | 3/2015 | Amiga .................. H04L 63/145 726/28 |
| 2015/0120804 A1 * | 4/2015 | Eschbach ................ H04L 43/04 709/203 |
| 2015/0154298 A1 * | 6/2015 | Haig ................... G06F 17/30864 707/661 |
| 2015/0215325 A1 * | 7/2015 | Ogawa .................... G06F 16/13 726/23 |
| 2015/0310126 A1 * | 10/2015 | Steiner ................ G06F 17/2247 715/204 |
| 2015/0324166 A1 * | 11/2015 | Lin .......................... G06F 3/165 709/203 |
| 2016/0171106 A1 * | 6/2016 | Song ................... G06F 17/30867 707/709 |
| 2016/0266730 A1 * | 9/2016 | Franke ............... G06F 17/30873 |
| 2016/0275561 A1 * | 9/2016 | Kosloske ........... G06Q 30/0269 |
| 2016/0299988 A1 * | 10/2016 | Pancharathi ...... G06F 17/30896 |
| 2016/0323136 A1 * | 11/2016 | Yuhan ............... G06F 17/30861 |
| 2017/0034244 A1 * | 2/2017 | Eschbach ................ H04L 67/06 |
| 2017/0185368 A1 * | 6/2017 | Handrigan ............. G06F 3/1454 |
| 2017/0223266 A1 * | 8/2017 | Rapoport ............ H04N 5/23216 |

(56) References Cited

U.S. PATENT DOCUMENTS

2017/0289267 A1* 10/2017 Eschbach .............. H04L 67/142
2017/0330302 A1* 11/2017 Rintala ................. G06T 1/0007

FOREIGN PATENT DOCUMENTS

| JP | 2005332188 A | 12/2005 |
|---|---|---|
| WO | 2002071192 A2 | 9/2002 |
| WO | 2011139583 A1 | 11/2011 |

OTHER PUBLICATIONS http://ezinearticles.com/?Evidence-From-the-Web:-How-to-Prove-That-That-Data-Was-Actualty-There&id=8560202 (http://tinyurl.com/llcfm38).

http://web.archive.org/web/20140104070327/http://www.icanprove.com/ (http://tinyurl.com/n426dla).

David W. Hagy, Investigations Involving the Internet and Computer Networks, National Institute of Justice Special Report, Jan. 2007, U.S. Department of Justice, Washington DC, USA.

Shane Thomas, PCT International Search Report, dated Apr. 6, 2015, Alexandria, Virginia, United States of America.

Shane Thomas, PCT Written Opinion of the International Searching Authority, dated Apr. 6, 2015, Alexandria, Virginia, United States of America.

U.S. Patent and Trademark Office, U.S. Appl. No. 14/062,471 Office Action, dated Sep. 23, 2015, USPTO, Alexandria, United States.

U.S. Patent and Trademark Office, U.S. Appl. No. 14/062,471 Office Action, dated May 6, 2016, USPTO, Alexandria, United States.

U.S. Patent and Trademark Office, U.S. Appl. No. 14/062,471 Office Action, dated Oct. 18, 2016, USPTO, Alexandria, United States.

European Patent Office, Extended European Search Report and Search Opinion, dated May 12, 2017, EPO, Munich, Germany.

U.S. Patent and Trademark Office, U.S. Appl. No. 14/815,678 Office Action, dated Mar. 30, 2018, USPTO, Alexandria, United States.

* cited by examiner

| Page Vault - Scheduled Capture | |
|---|---|
| URL: | http://www.facebook.com/Zachry.Wells ~1202 |
| Login: | Brad Delph ~1204 |
| Password: | *********** ~1206 |

1208 — ● Capture on: April 4, 2015 at 3:15 pm ~1210

Recapture every: 7   hours ○
            days ●
  1212 →   weeks ○

Repeat capture 4 times ~1214

1216 — ○ Custom schedule: [            ] ~1218

METHOD AND SYSTEM FOR CAPTURING WEB CONTENT FROM A WEB SERVER AS A SET OF IMAGES

FIELD OF THE DISCLOSURE

The present disclosure relates generally to capturing web content from a web server and more particularly to a client device actively controlling the remote capture of web content from a web server as a set of images.

BACKGROUND

As the proliferation of computer technology increases, so does the volume of data that is shared electronically over computer networks. Presently, digital media is already the dominant format by which information is disseminated, and the Internet continues to grow exponentially. For the most part, web content that exists in the cloud is beneficial, but as with all things, there is a portion that foments controversy. With increasing frequency, web content is playing a role in judicial proceedings, often in support of, or as the focus of, litigation. In either case, it becomes necessary to gather web content in discovery to serve as evidence for trials. An e-mail, for example, might prove the existence or terms of a contract; an Internet video might show criminal behavior; a defamatory comment might be libelous; or a product webpage might provide proof of trademark infringement.

With the capture of web content for evidentiary purposes still in its infancy, capturing and archiving a wide variety of content that is based on diverging technology standards presents difficulties that need to be overcome. Further complicating matters are stringent requirements codified by different judicial bodies at the federal, state, and local levels regarding the qualification of submitted evidence. Electronic evidence must be properly authenticated, and the method by which it is obtained must provide acceptable assurances of data integrity.

BRIEF DESCRIPTION OF THE FIGURES

The accompanying figures, where like reference numbers refer to identical or functionally similar elements throughout the separate views, form part of the specification and illustrate embodiments in accordance with the included claims.

FIGS. 6A and 6B show captured images illustrating the effect of blocking rollovers, in accordance with some embodiments.

FIGS. 10A, 10B, and 10C show captured images illustrating the effect of applying a comparative algorithm to a pair of portions of a webpage, in accordance with some embodiments.

FIGS. 11A and 11B show captured images illustrating the effect of applying a comparative algorithm to three pairs of portions of a webpage, in accordance with some embodiments.

FIG. 12 shows an interactive graphic presented by a client device for scheduling captures, in accordance with some embodiments.

Figure 1:
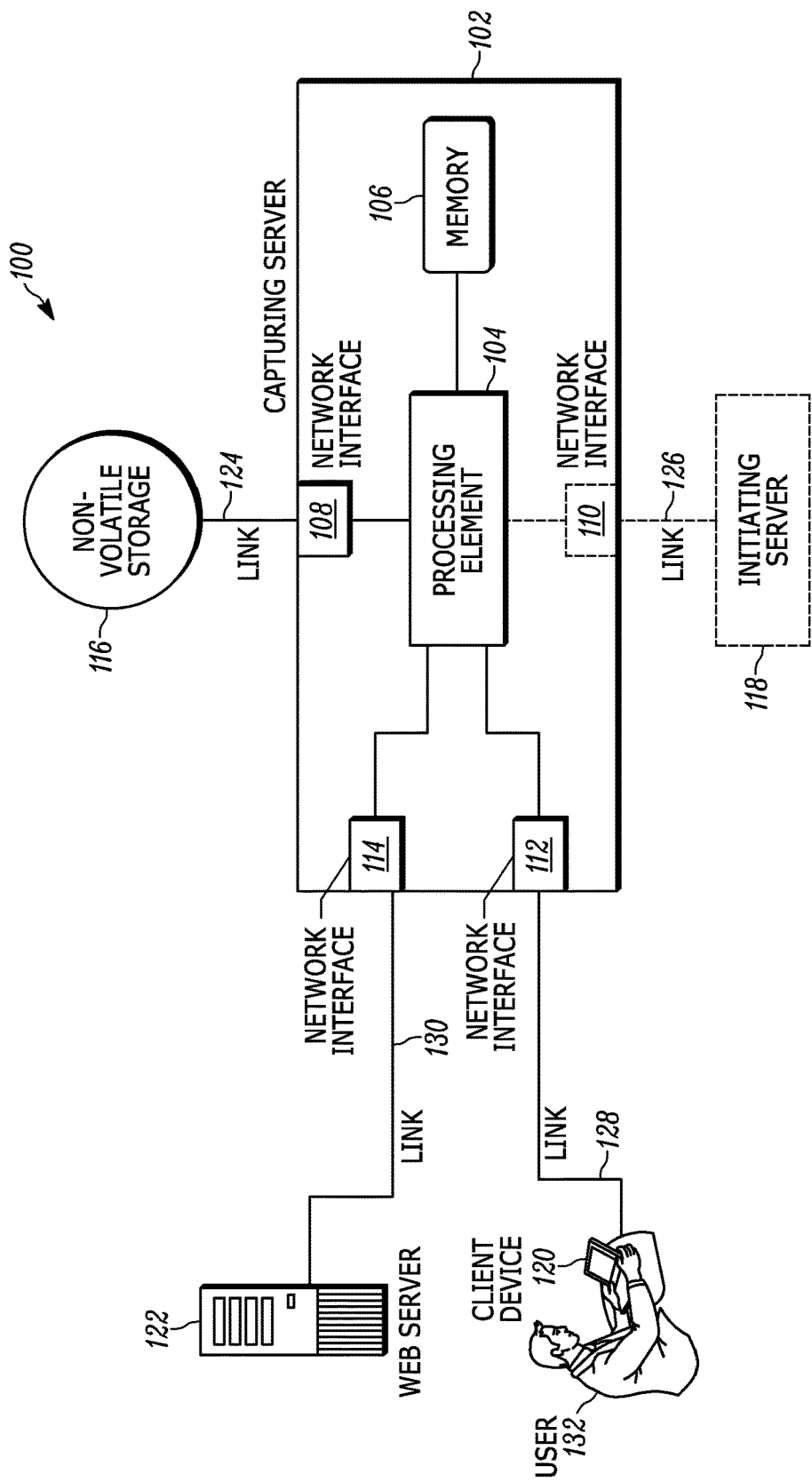
FIG. 1 shows a block diagram of a system for capturing web content as a set of images, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

System, apparatus, and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and system for capturing web content from a web server to a non-volatile storage device as a set of images for later retrieval. The method and system allow for capturing the web content under the direction of a client device while maintaining data integrity by excluding the client device from a chain of custody for the captured web content. Excluding a client device from a chain of custody for captured web content means that a capturing server captures web content from a data stream that carries the web content from a web server to the capturing server without the data stream being routed through the client device.

More specifically, in accordance with the teachings herein, a method performed by a capturing server for capturing web content from a web server includes establishing an active link between a client device and the capturing server that allows the client device to remotely control an active web browsing session, between the capturing server and the web server, to select web content. The method also includes establishing the active web browsing session between the capturing server and the web server using a web browser executing on the capturing server. The capturing server receives the web content from the web server, without the web content being routed through the client device, and captures the web content during the active web browsing session as a set of images of the web browser. The set of images is captured to a non-volatile storage device, remote from the client device, for later retrieval on a future date.

Also in accordance with the teachings herein, a capturing server configured to capture web content from a web server includes a first network interface configured to establish an active link with a client device and a second network interface configured to establish an active web browsing session with a web server. The capturing server further includes a processing element operatively coupled to the first and second network interfaces, wherein the processing element is configured to establish the active link with the client device that allows the client device to remotely control the active web browsing session, between the capturing server and the web server, to select web content. The processing element is also configured to establish the active web browsing session with the web server using a web browser executing on the capturing server and receive the web content from the web server without the web content being routed through the client device. Further, the processing element is configured to capture the web content during the active web browsing session as a set of images of the web browser, wherein the set of images is captured to a non-volatile storage device, remote from the client device, for later retrieval on a future date.

Referring now to the drawings, and in particular FIG. 1, a web content capturing system (also referred to herein as a capturing system or simply a system) consistent with some embodiments of the present teachings is shown and indicated at 100. The capturing system 100 includes a capturing server 102, a client device 120, a web server 122, non-volatile storage 116, and an optional initiating server 118. The capturing server 102 includes: a processing element 104, memory 106, and network interfaces 108, 110, 112, 114. As shown, the capturing server 102 is coupled from the network interfaces 112, 114, and 108 to similar interfaces on the client device 120, the web server 122, and the non-volatile storage 116 by active links 128, 130, and 124, respectively. In an optional configuration, as indicated by broken lines, the capturing server 102 is also coupled from the network interface 110 to the initiating server 118 by a link 126.

A limited number of system and server components 102, 104, 106, 108, 110, 112, 114, 116, 118, 120, 122, 124, 126, 128, 130 are shown at 100 for ease of illustration, but other embodiments may include a lesser or greater number of such components in a capturing system or capturing server of the system. Moreover, other components needed for a commercial embodiment of a capturing system or a capturing server that incorporates the components shown at 100 are omitted from FIG. 1 for clarity in describing the enclosed embodiments.

We now turn to a brief description of the components 102 116, 118, 120, 122, 124, 126, 128, and 130 within the capturing system 100 and of the components 104, 106, 108, 110, 112, and 114 within the capturing server 102. In general, the capturing server 102, or more specifically, the processing element 104 within the capturing server 102, is configured with functionality in accordance with embodiments of the present disclosure as described in detail below with respect to the remaining figures. "Adapted," "operative," "capable" or "configured" means that the indicated components are implemented using one or more hardware elements such as one or more operatively coupled processing cores, memory elements, and interfaces, which may or may not be programmed with software and/or firmware as the means for the indicated components to implement their desired functionality. Such functionality is supported by the other hardware shown in FIG. 1, including the components 106, 108, 110, 112, 114, 116, 118, 120, 122, 124, 126, 128, and 130.

The processing element 104 represents one or more processing cores and includes arithmetic logic and registers necessary to perform the digital processing, in whole or in part, required by the capturing server 102 to capture web content and operate in a manner consistent with the embodiments described herein. For one embodiment, the processing element 104 represents a primary microprocessor, also referred to as a central processing unit (CPU), of the capturing server 102. In another embodiment, the processing element 104 is an ancillary processor, separate from the CPU, wherein the ancillary processor is dedicated to providing additional processing capability, in whole or in part, needed for components of the capturing server 102 to perform at least some of their intended functionality. For a particular embodiment, the processing element 104 is implemented as a system-on-chip (SoC).

The memory 106 provides storage of electronic data used by the processing element 104 in performing its functionality. For example, the processing element 104 can use the memory 106 to load programs and/or store files associated with capturing web content. In one embodiment, the memory 106 represents random access memory (RAM). In other embodiments, the memory 106 represents volatile or non-volatile memory. For a particular embodiment, a portion of the memory 106 is removable. For example, the processing element 104 can use RAM to cache data while it uses a micro secure digital (microSD) card to store files associated with capturing web content.

The network interfaces 108, 110, 112, and 114 are points of interconnection that couple the capturing server 102 to the network or networks to which the non-volatile storage 116, the initiating server 118, the client device 120, and the web server 122, respectively, are connected. In an embodiment with fewer network interfaces, one or more network interfaces are shared among two or more of the components 116, 118, 120, and 122. The network interfaces 108, 110, 112, 114 can be wireless interfaces, wired interfaces, or a combination of the two. An example of a wireless network interface is a wireless local area network (WLAN) transceiver. An example of a wired interface is an RJ-45 socket configured to accept category 5 (CAT5) or category 6 (CAT6) Ethernet cable.

The links 124, 126, 128, and 130 represent "communication conduits" between components of the capturing system 100, or more specifically, wired or wireless connections (e.g., Ethernet connections) that allow coupled components to exchange data and/or control signals. Each link can be a single connection or include multiple connections of varying types. Multiple connections, for example, can create a chain of intermediary devices such as proxy servers, base stations, access points, or other network devices (not shown) that form a link shown between two components of the system 100. The connections, in turn, utilize one or more technologies to communicate data and/or control signals. These technologies can include, but are not limited to Worldwide Interoperability for Microwave Access (WiMAX), Wi-Fi, fourth-generation Long Term Evolution (4G LTE), fixed wireless (e.g., Motorola Canopy), Integrated Services Digital Network (ISDN), Broadband ISDN (B-ISDN), Digital Subscriber Line (DSL), and Synchronous Optical Networking (SONET).

Under the direction of the client device 120, while the client device 120 is being operated by a user 132 (also referred to herein as a subscriber), the capturing server 102 is configured to capture web content being hosted by the web server 122 and to store the captured web content using the non-volatile storage 116. Web content is defined herein as data that is accessible to a computer or computing device that is connected to a network of computing devices (e.g. a LAN), or a network of such networks (e.g., the Internet). Web content includes textual, visual, and/or aural data that is formatted and hosted by one or more content servers (e.g., the web server 122). Web content includes, but is not limited to, data that is formatted as: documents, applications, text, pictures, videos, movies, music, e-services, and/or e-mails. In some instances, web content is integrated into one or more interactive documents (e.g., webpages) that are hosted by a content server and browsable by a client device.

Additionally, web content includes both deep web content and surface web content. Deep web content is not crawlable (i.e., cannot be found by programs commonly referred to as web bots, crawlers, or spiders) and thus not indexed by standard search engines such as Google or Yahoo!. In one instance, deep web content is stored in searchable databases that only produce results dynamically in response to a direct request from an authorized client. For example, a bank server will only provide an account balance to an account holder who has been authenticated through the use of a password and a personal identification number (PIN). In another instance, deep web content is dynamically generated in response to interactive input. For instance, an algorithm run by a content server may provide diagnostic information to a mechanic who provides responses to a series of pre-programmed inquiries.

Facebook, Twitter, and LinkedIn serve as examples of social media sites that include deep web content. A user browsing to a social media site might access deep web content by "clicking" a radio button, entering text into a field, expanding content so hidden text becomes visible, or scrolling to generate more displayed content (e.g., expand a timeline in Facebook). Clicking means to select using a mouse, stylus, or other input device (e.g., tapping a touch screen using a finger).

In contrast to deep web content, surface web content is static content hosted by a content server that is indexable by standard search engines and accessible to a web browser (also referred to herein simply as a browser) executing on a client device through the use of a uniform resource locator (URL) without the need for further interaction. For example, navigating to the URL www.whitehouse.gov brings up a static webpage that displays surface web content relating to the office of the President. Any additional web content requiring further user input to obtain and display within the webpage represents deep web content.

It is the client device 120 that directs the capturing server 102 to the web content that is captured. The client device 120 is any device capable of establishing a network connection and browsing web content hosted by a content server. Examples of client devices include, but are not limited to: desktop computers, laptops, tablets, phablets, smartphones, wearable computing devices, personal digital assistants (PDAs), and Internet-capable televisions.

It is the web server 122 that hosts web content that is captured. The web server 122 is any device capable of establishing a network connection and hosting web content that it provides to other networked devices, such as the capturing server 102 or the client device 120, in response to requests received from those devices. In one embodiment, the web server 122 represents one or more dedicated machines or scalable structures that host commercial, educational, or governmental web content. In another embodiment, the web server 122 represents a personal computer that, through the installation of specialized software (e.g., Apache HTTP Server), hosts a personal webpage or website. In a further embodiment, the web server 122 provides a virtual gaming environment that allows geographically separated users to participate in a shared gaming experience.

The non-volatile storage 116, also referred to herein as a non-volatile storage device, provides the capturing server 102 with long-term storage for the web content it captures from the web server 122 and other content servers. Long-term storage can span multiple days, weeks, months, or years. For different embodiments, the non-volatile storage 116 is a magnetic (e.g., hard drive or tape), solid state (e.g., SSD or flash memory), or optical (e.g., writable DVD or holographic) storage device. In some embodiments, the non-volatile storage 116 is co-located with or physically integrated into the capturing server 102. In other embodiments, the non-volatile storage 116 is remote to (not co-located with) the capturing server 102, as shown. In further embodiments, the non-volatile storage 116 represents multiple storage devices of the same or different types that are located together or apart from one another. For all embodiments, the non-volatile storage 116 is remote to (located apart from) the client device 120. In some embodiments, the non-volatile storage device 116 is a network storage device.

The term "capture" refers to the capturing server 102 storing a copy of web content hosted by the web server 122, or other content server, to the non-volatile storage 116 as a set of images. A set may have only a single element or include multiple elements. In one embodiment, the capturing server 102 captures web content from multiple webpages. In another embodiment, the capturing server 102 captures web content from multiple web servers, for example, when the multiple webpages are hosted by different web servers. For a different embodiment, different portions of a webpage are hosted by and captured from different web servers. A webpage hosted by the web server 122, for example, includes imbedded images which are hosted by and captured from a different web server. In a further embodiment, the capturing server 102 uses Hypertext Transfer Protocol (HTTP) and/or File Transfer Protocol (FTP) to get web content for capture from the web server 122.

Capturing web content for some embodiments includes storing the web content with additional information, such as metadata, which is described in greater detail below. Capturing a webpage can include the capturing server 102 storing one or more screenshots of the entire webpage, or it might include the capturing server 102 storing images for only a portion of the webpage being actively displayed by the client device 120. Web content that is captured by the capturing server 102 is made available for later viewing by authorized users. For example, an authorized user recalls captured web content, upon entering his password, through a publically available URL using any Internet-accessible client device. In a particular embodiment, the user 132 retrieves the captured web content on a different calendar date from when the web content was captured.

In capturing web content, the client device 120 directs the capturing server 102 to the web content using the active link 128, the capturing server 102 receives the web content using the active link 130, and the capturing server 102 stores the web content using the active link 124. Each of the links 128, 130, and 124 is specified as an active link within the capturing system 100. The "active" designation indicates that these links are used simultaneously or in brief succession to one another, allowing the capturing server 102 to perform its described capturing functionality in real time while it is being directed by the client device 120.

In one embodiment, an active link between devices is established when the devices have exchanged the proper messaging to do so in accordance with a given communication protocol that the devices are implementing. Similarly, the link is taken down by the requisite protocol signaling. In a further embodiment, the link is established to support a web browsing session between the devices. A web browsing session between devices is an active web browsing session while a link between the devices is being used to support the web browsing session after the link is established and before the link is taken down.

Notwithstanding normal network delays associated with limited bandwidth or loaded servers, for example, the capturing server 102 does not queue web content specified by the client device 120 for later capture (e.g., a capture scheduled for a particular time or executed after a waiting period of minutes or hours) in performing real-time captures. The capturing server 102 receives web content as it is directed to the web content by the client device 120, and the capturing server 102 captures the web content when it is instructed to capture the web content by the client device 120. During a real-time capture, for example, web content is received using the active link 130, selected using the active link 128, and captured using the active link 124 while the active links 130, 128, 124 are all simultaneously in use, as indicated by the prefix "active." For some embodiments, the capturing server 102 also performs scheduled captures in addition to, but not in place of, real-time captures. Scheduled captures are described in greater detail with reference to FIG. 12.

For a particular embodiment, the capturing server 102 captures web content in real time by storing the web content to the non-volatile storage 116 at the same time the web content is made available for display at the client device 120. In another embodiment, the capturing server 102 does queue web content specified by the client device 120 for later capture but the capturing server 102 captures the specified web content while the active link 128 is established. In other words, for real-time captures, the capturing server 102 captures the specified web content during the capturing session between the client device 120 and the capturing server 102, before the active link 128 is taken down.

For several embodiments, the initiating server 118 is configured to initialize the capturing server 102 and to provide a set of identifiers to at least one of (i.e., one or more of) the capturing server 102, the client device 120, or the non-volatile storage 116 device. The set of identifiers is configured to allow the establishment of the active link 128, between the capturing server 102 and the client device 120, and the active link 124, between the capturing server 102 and at least a portion of the non-volatile storage 116. Some embodiments relate to multiple client devices directing the capture of different web contents from multiple web servers. The client device 120 might be directing the capture of web content from the web server 122 for a trademark infringement case while another client device is directing the capture of different web content from another web server for use in a defamation lawsuit. For multiple client devices, a single capturing server (e.g., capturing server 102) might capture the web content it is directed to by the multiple client devices. Alternatively, separate capturing servers, one for each client device, might be used within the system 100 so that each capturing server captures only the web content it is directed to by a single client device.

For embodiments where there is a one-to-one correspondence between capturing servers and client devices, the initiating server 118 initializes a capturing server for each client device as a need arises. For example, the initiating server 118 initializes the capturing server 102 as the client device 120 logs on to or otherwise identifies to the initiating server 118 its intent to use the system 100 to capture web content. From an Internet Protocol (IP) address or login information, the initiating server 118 recognizes that the client device 120 or the user 132, respectively, is associated with a subscriber who is authorized (e.g., through a paid subscription) to use the system 100 to capture web content. The initiating server 118 is also aware of the non-volatile storage 116, and any portion of it that is allocated to store captured web content for the client device 120. That portion of the non-volatile storage 116, for example, might be identified by a particular geographic storage location, a particular disk or sector at that location, and/or a particular directory of the non-volatile storage 116.

For a particular embodiment, the initiating server 118 initializes the capturing server 102 when the initiating server 118 receives an indication that the client device 120 is ready to use the capturing system 100 to capture web content. For example, the indication is provided when the client device 120 initiates a capture mode. For instance, the initiating server 118, using an Internet connection (not shown) initializes the capturing server 102 by creating a virtual machine using a service that hosts virtual machines, which run in the cloud. Cloud computing refers to computational resources that are provided by a third party and made available over one or more Internet connections. Google Cloud Platform (GCP), for example, allows for the creation of virtual machines using Google's infrastructure. Amazon Elastic Compute Cloud (EC2) and Windows Azure also allow for the creation of virtual machines using Amazon's and Microsoft's cloud computing platforms, respectively.

The virtual machine the initiating server 118 creates in the cloud for the client device 120 becomes the capturing server 102, which runs its own operating system independently from other virtual machines the initiating server 118 creates for other client devices. For an embodiment, the initiating server 118 also provides software for execution on the virtual machine that allows the virtual machine to perform its functionality as described herein. For an embodiment where the capturing server 102 is a virtual machine, the hardware components 104, 106, 108, 110, 112, 114 used by the capturing server 102 represent hardware components of the platform hosting the virtual machine (e.g., hardware components within the Google, Amazon, or Microsoft servers).

After the initiating server 118 initializes the capturing server 102 by creating it as a virtual machine, or making it ready for use if already created, the initiating server 118 provides identifiers to one of or a combination of the capturing server 102, the client device 120, and/or the non-volatile storage 116. This allows the capturing server 102, the client device 120, and the non-volatile storage 116 to couple by forming the links 128 and 124, enabling the capturing system 100 to perform its described functionality. The capturing server 102 creates the link 130 as the client device 120 directs the capturing server 102 to web content hosted by the web server 122.

For one embodiment, the initiating server 118 provides the client device 120 with an identifier (e.g., an IP address) for the capturing server 102. Responsively, the client device 120 initiates the link 128 with the capturing server 102. For another embodiment, the capturing server 102 receives an identifier for the client device 120 from the initiating server 118 and responsively initiates the link 128. Analogously, the link 124 between the capturing server 102 and the non-volatile storage 116 is initiated by each of the two components in different embodiments.

For some embodiments, the initiating server 118 creates a number of virtual machines before they are needed by a client device. This creates "headroom" within the capturing system 100 that allows the system 100 to respond faster when a virtual machine is needed by a client device. As the capturing server 102 is created as a virtual machine when needed by the client device 120, it is also taken down again when it is no longer needed by the client device 120. For a particular embodiment, virtual machines are not reused. Providing each client device with its own newly created capturing server with fresh software ensures a higher level of security against hacking, data manipulation, malicious code, and other undesirable occurrences. This results in greater data integrity for at least three capture mechanisms used by the capturing servers in different embodiments. In an alternate embodiment, virtual machines are reused but only by the same subscriber (e.g., as identified by an IP address or login information). This allows the virtual machine to retain and use subscriber-specific information for future capturing sessions. Always assigning a virtual machine back to the same subscriber greatly reduces the chance of an unauthorized user having access to the virtual machine before, during, or after a capturing session.

Figure 2:
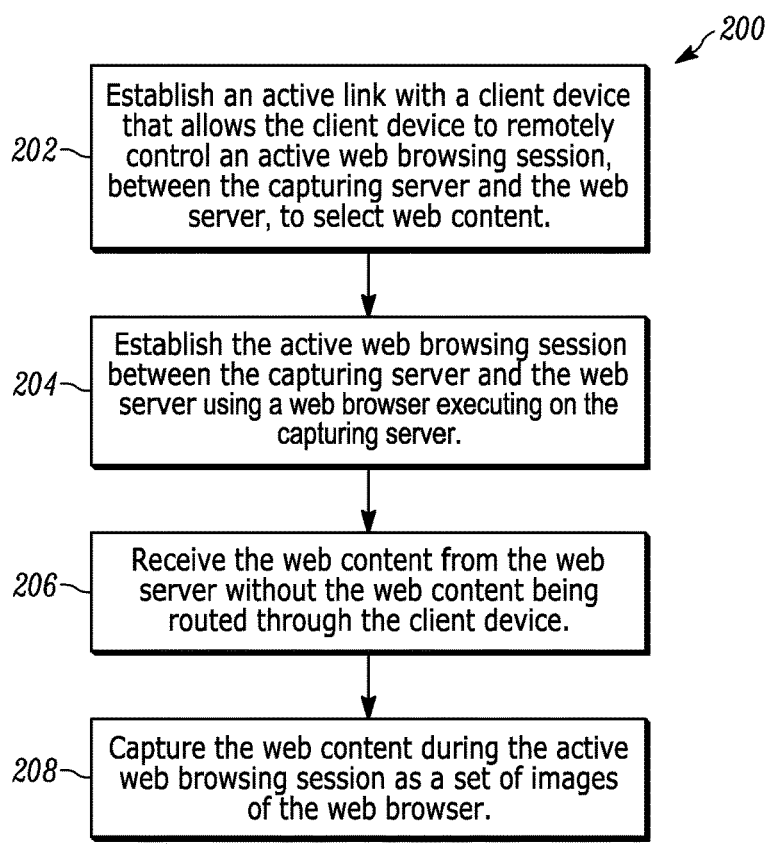
FIG. 2 shows a logical flow diagram illustrating a method for capturing web content as a set of images, in accordance with some embodiments.

We turn now to a detailed description of the functionality of the system components shown in FIG. 1 in accordance with the teachings herein and by reference to the remaining figures. FIG. 2 shows a logical flow diagram illustrating a method 200 performed by the capturing server 102 to capture web content under the direction of the client device 120 using a first capture mechanism. Generally, the client device 120 executes a remote control protocol (RCP) that allows the client device 120 to control a web browsing session established between the capturing server 102 and the web server 122. An RCP is a protocol and/or an application that allows the user 132 of the client device 120 to remotely control a web browser running on the capturing server 102. In different embodiments, different RCPs may be used which are associated with different sets of standards and/or software developers.

Specifically, the capturing server 102 establishes 202 the active link 128 with the client device 120 to allow the client device 120 to remotely control a web browsing session, using an RCP, between the capturing server 102 and the web server 122 to select web content. As indicated previously, the active link 128 is initiated by the capturing server 102 in some embodiments and initiated by the client device 120 in other embodiments. For a particular embodiment, the client device 120 executes Remote Desktop Protocol (RDP), a proprietary remote control protocol developed by the Microsoft Corporation that provides a graphical interface on the client device 120 for the user 132 to remotely control the web browsing session between the capturing server 102 and the web server 122.

The capturing server 102 establishes 204 the active web browsing session between itself and the web server 122 using a web browser. The web browser executes on the capturing server 102 and the active link 130 supports the web browsing session. For different embodiments, web browsing sessions support both the simple object access protocol (SOAP), the representational state transfer (REST) web service protocol, or other web "surfing" paradigms. A session is defined herein as a semi-permanent interactive information interchange or "dialog" between two computing devices to accomplish a specific objective, which in this case is web browsing.

By this definition, a session, specifically a remote control session, is running between the client device 120 and the capturing server 102. The active link 128 supports the remote control session, which runs contemporaneously with the web browsing session supported by the active link 130. Under the direction of the client device 120, the capturing server 102 browses the web content hosted by the web server 122. For an embodiment, the capturing server 102 captures the web content it receives from the web server 122 before sending the web content, or a graphical representation of the web content, to the client device 120. For another embodiment, the capturing server 102 captures the web content from a data stream that has not passed through the client device 120.

Using the RCP, the client device 120 directs the capturing server 102, or more specifically, the web browser executing on the capturing server 102, to the web server 122. As the web browser navigates web content hosted by the web server 122, the capturing server 102 receives 206 the web content from the web server 122 without the web content being routed through the client device 120. During the active web browsing session, the client device 120 selects web content to capture, and the capturing server 102 captures 208 the selected web content as a set of images by storing the set of images to the non-volatile storage 116.

Each image of the set of images is visual representation of how the captured web content appears in the web browser executing on the capturing server 102. The images are sometimes described as screenshots of screens being displayed on the web browser executing on the capturing server 102. In some instances, however, the capturing server 102 does not include a display, or if it does include a display, the capturing server 102 is not using it to show the web browser it is executing. In these instances, an image or screenshot refers to a visual representation of how web content is loaded in the web browser existing within the registers of the processing element 104 and in memory 106. It is how the web content would appear on a screen of a display if the display were connected to the capturing server 102 and being used to show the web browser.

For some embodiments, the capturing server 102 uses a capturing mechanism different from the first capturing mechanism indicated above for capturing web content. Using a second capture mechanism, for example, the client device 120 launches a web browser and establishes a web browsing session between itself and the web server 122, which is supported by the active links 128 and 130. Session traffic, which includes the web content hosted by the web server 122, is directed (i.e., routed) to pass through the capturing server 102. For an embodiment, the capturing server 102 captures the web content to the non-volatile storage 116 as a set of images as it passes through the capturing server 102 from the web server 122 over the active link 130 on its way to the client device 120 over the active link 128.

For a third capture mechanism, the capturing server 102 executes both a web browser and a content server. In total, two web browsing sessions are running contemporaneously: a first web browsing session between the client device 120 and the capturing server 102, supported by the active link 128, and a second web browsing session between the capturing server 102 and the web server 122, supported by the active link 130. Also, both the web server 122 and the capturing server 102 host the same web content. The capturing server 102 executes a web browser (e.g., Firefox, Internet Explorer, Opera, Google Chrome, etc.) to browse the web server 122. The capturing server 102 also executes a content server (e.g., Apache HTTP Server, Nginx, Lighttpd, etc.) to host the web content it receives from the web server 122 for redisplay back down to the client device 120.

Using the first web browsing session, the client device 120 browses the web content hosted by the capturing server 102. The webpages constructed by the capturing server 102 using its content server are recreations of the webpages hosted by the web server 122. As the client device 120 browses (i.e., clicks on) links embedded within the webpages hosted by (the content server of) the capturing server 102, the capturing server 102 uses the second web browsing session to retrieve the selected content from the webpages hosted by the web server 122 and replicate the content in its own webpages. As the client device 120 selects web content for capture, the capturing server 102 captures the selected web content it receives from the web server 122 over the active link 130 using the second web browsing session. The selected web content is again captured to the non-volatile storage 116 as a set of images.

A benefit of the first and third capture mechanisms is a mitigated risk of exposing the client device 120 to malicious code and/or spyware as a result of browsing web content for capture. Using the first capture mechanism, for example, the client device 120 remotely controls a web browsing session between the capturing server 102 and the web server 122. Web content hosted by the web server 122 is downloaded to the capturing server 102. From the capturing server 102, image data representing the web content, and not the actual web content, is downloaded to the client device 120 to support a graphical interface of the RCP executing on the client device 120.

Capturing web content as a set of images means that at least a portion of the web content is stored to non-volatile storage as one or more image files that include digital data that can be rasterized or otherwise adapted (e.g., from raw or vector formats) for visual presentation, such as on a display or printer. A non-exhaustive list of image files includes Joint Photographic Experts Group (JPEG), Tagged Image File Format (TIFF), Graphics interchange Format (GIF), Portable Network Graphics (PNG), Bitmap (BMP), Camera Image File Format (CIFF), Digital Negative (DNG), Scalable Vector Graphics (SVG), Portable Document Format (PDF), and Encapsulated Postscript (EPS) files. As defined herein, image files include video file formats. This is based on the reasoning that a video or a movie is an ordered set of images displayed in succession. Therefore, a web resource can be captured as a set of images using Moving Picture Experts Group (MPEG), Matroska (MKV), Flash Video (FLV), Video Object (VOB), "Ogging" (OGG), and Audio Video Interleaved (AVI) container formats, for example.

In some instances, web content hosted by a particular web server is inaccessible to the capturing server 102 based on attributes relating to the capturing server 102. Such attributes might include, but are not limited to, an Internet service provider (ISP) for the capturing server 102, an IP address of the capturing server 102, cookies exchanged with the capturing server 102, or credentials supplied by the capturing server 102. For example, the capturing server 102 and the web server 122 are located in different countries such that web content being hosted by the web server 122 is not accessible to the capturing server 102 given the capturing server's location-dependent IP address. The web content hosted by the web server 122 is geo-restricted, and the capturing server 102 is automatically blocked. The capturing server 102 can bypass such regional restrictions in a number of ways.

For a first embodiment, a capturing session for the client device 120 is transferred from the capturing server 102 to another capturing server having a more favorable geographic location when the capturing server 102 is geo-blocked from selected web content based on its IP address. Another active link is established between the client device 120 and the other capturing server. The capturing session is then transferred to this other active link either temporarily or for the duration of the capturing session. Depending upon whether this transfer is permanent or temporary, the active link 128 may or may not be taken down.

For a second embodiment, the capturing server 102 routes a request for geo-restricted web content, from which the capturing server 102 is blocked, through another capturing server in a more favorable geographic location. An alternate active link to the active link 130 is established so that the other capturing server is communicatively coupled between the capturing server 102 and the web server 122 hosting the geo-restricted web content. The capturing server 102 directs the request for web content to the other capturing server, and the other capturing server requests the web content from the web server 122. Upon receiving the requested web content, the other capturing server forwards the web content to the capturing server 102.

For a third embodiment, by establishing and using an alternate active link to the active link 130, the capturing server 102 routes a request for geo-restricted web content being hosted by the web server 122 through a proxy server. In one instance, the capturing server 102 routes the request through a smart DNS proxy server. In another instance, the capturing server 102 uses another type of proxy server and/or a proxy tool to make an IP address substitution to gain access to geo-restricted web content.

In a second example, a server for an ISP is an intermediary device on the active link 130 between the capturing server 102 and the web server 122. The web server 122 is configured so that web content hosted by the web server 122 is inaccessible to the ISP server, also making the web content inaccessible to the capturing server 102. The capturing server 102 can gain access to the web content in two ways.

For a first embodiment, the capturing server 102 uses multiple ISPs. The capturing server 102 might use multiple ISPs so that service to the user 132, and also other subscribers, is not interrupted when service from a first ISP of the multiple ISPs is temporarily interrupted. While the first ISP is down, the capturing server 102 switches to a second ISP of the multiple ISPs to keep providing service to the user 132. If, while the first ISP is up, the capturing server 102 cannot gain access to web content hosted by the web server 122, the capturing server 102 establishes another active link to the web server 122 that is routed through a server for the second ISP in an attempt to gain access to the web content.

For a second embodiment, the capturing server 102 transfers the web browsing session the client device 120 is remotely controlling to another capturing server that is using an ISP different from the ISP being used by the capturing server 102. The other capturing server might be actively linked to the non-volatile storage 116 so that web content captured for the client device 120 continues to be stored at a single location. Alternatively, the other capturing server might capture web content to another non-volatile storage device. In one case, captured web content is synched between the two non-volatile storage devices over a network connection communicatively coupling the two non-volatile storage devices.

Figure 3:
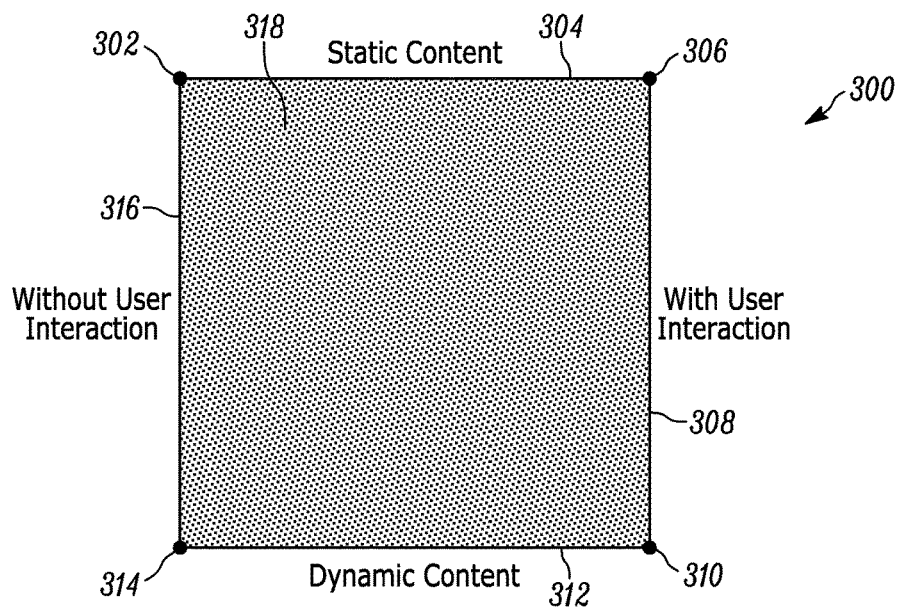
FIG. 3 shows a schematic diagram illustrating the capture of different types of web content, in accordance with some embodiments.

FIG. 3 shows a schematic diagram of a square 300 illustrating different ways of capturing selected web content. Under different use cases, different types of web content are selected for capture. These types of web content and the way in which they are captured are represented by a square 300, which has four edges 304, 308, 312, 316 and four vertices 302, 306, 310, 314. The upper 304 and lower 312 edges of the square 300 represent the capture of static and dynamic web content, respectively. The right edge 308 of the square 300 represents capturing user interactions with selected web content, and the left edge of the square 300 represents the omission of user interactions from captured web content.

The upper-left vertex 302 of the square 300, where the edges 304 and 316 converge, represents the capture of static web content without user interaction. Static web content is web content that remains visually fixed during a time interval over which the web content is captured. Capturing the image of a painting being displayed by a web browser exemplifies the capture of static web content. Because the painting does not change, a single screenshot of the painting is sufficient to capture it.

In some instances, however, due to the amount of static web content being captured, multiple screenshots may be needed to capture it in its entirety. If a webpage is too long and/or too wide to be completely displayed by a web browser without scrolling, then multiple screenshots of the web browser are used to capture the webpage. For a first embodiment, the capturing server 102 captures a long webpage using successive screenshots as it scrolls the webpage from top to bottom a screen at a time. For a second embodiment, the capturing server 102 captures a wide webpage using successive screenshots as it scrolls the webpage from left to right a screen at a time. For a third embodiment, the capturing server 102 captures a webpage that is both too long and too wide to be captured in a single screenshot. The capturing server 102 captures the webpage by taking multiple screenshots as it scrolls the webpage in either the vertical or the horizontal directions a screen at a time so a resulting set of screenshots captures the webpage in its entirety.

In another instance, the area covered by a screenshot selected to be of a particular size is smaller than a viewable area of web content being displayed. While the web content could be captured with a single screenshot, multiple screenshots are used instead to capture the web content. Screenshots of a particular size are also referred to herein as "tiles."

For one embodiment, the capturing server 102 capturing web content includes the capturing server 102 capturing audio content where the web content selected for capture includes audio content. A web browser, for example, uses a browser plug-in to play French music as it displays an image of the Eiffel Tower. A portion of the web content, namely the image, is captured using an image file. The audio portion of the web content is captured using an audio file, such as an MPEG MP3, Waveform Audio File Format (WAV), Vorbis, Advanced Audio Coding (ACC) or Free Lossless Audio Codec (FLAC) file, for instance. A capturing server captures selected web content as set of images when a portion of the web content is stored to non-volatile storage using one or more image files. A remaining portion of the selected web content may be stored using any other type or types of files.

For another embodiment, the capturing server 102 capturing web content includes the capturing server 102 capturing other media where other media is represented by or imbedded in web content selected for capture.

The upper-right vertex 306 of the square 300, where the edges 304 and 308 converge, represents the capture of static web content with user interaction. For some embodiments, capturing web content selected for capture includes capturing the client device 120 interacting with the web content. In such cases, the capturing server 102 captures the web content as a set of images by capturing the web content as a video. The actions performed in the web browser executing on the capturing server 102 are controlled remotely by the client device 120 during a web browsing session. For some embodiments, the capturing server 102 captures these remotely controlled actions in addition to the web content being hosted by the web server 122. For a particular embodiment, the remotely controlled actions the capturing server 102 captures includes at least one of: a selection performed during the active web browsing session, a swipe performed during the active web browsing session, or a rollover performed during the active web browsing session. As the user 132 of the client device 120 moves his mouse, for example, the RCP allows for a cursor to move within the web browser executing on the capturing server 102. The cursor can swipe or move from one portion of a webpage displayed by the web browser to another. The cursor can make a selection as the user 132 uses the RCP to click his mouse when the cursor is aligned with a virtual button in the webpage. Combining these two actions, the user 132 can click on a scroll bar of the webpage and drag it to a different position. The user 132 can also perform a rollover by rolling or moving the cursor over an image or a portion of the webpage to display additional information on the image or to solicit another response from the webpage.

In an embodiment, these remotely controlled actions are captured with the web content that makes up the webpage hosted by the web server 122. The capturing server 102 captures both the information being sent to and received from the web server 122 to capture the web browsing session in its entirety. The captured content can be viewed later by playing it as a video, for example, as an MKV or an MPEG MP4 video. Shown in the video are the webpage, the user's interactions with the webpage, and the results of the interactions. For example, the video might show the user scrolling to the bottom of the webpage, clicking on a link to an image, and the resulting image being displayed. A video might also serve as evidence and be played during a trial to demonstrate to a technically unsophisticated jury how a website was coded to respond to particular inputs.

The lower-left vertex 314 of the square 300, where the edges 312 and 316 converge, represents the capture of dynamic web content without user interaction. Dynamic web content is web content having a visual portion that changes in time without user interaction. A movie or an animated sequence of frames playing on a webpage are examples of dynamic web content. Without user input received at the capturing server 102 through the client device 120 during an active web browsing session, the movie or animated sequence will continue to play to its conclusion. When dynamic web content is selected for capture, the capturing server 102 captures the dynamic web content as a set of images by capturing the dynamic web content as a video.

For a particular embodiment, dynamic web content, such as a video playing on a web browser, plays with a given frame rate. When the video is captured using a video file, the video is captured using this same frame rate. If, for example, a selected video plays on a webpage at 30 frames per second, then the video is captured at 30 frames per second. This allows an authorized user with access to the captured video to later view each frame of the video as it was presented on the webpage on a frame-by-frame basis. In other embodiments, the user 132 can select a custom frame rate for capturing dynamic web content, even if the selected frame rate does not match the original frame rate of the dynamic web content as presented on the webpage.

The lower-right vertex 310 of the square 300, where the edges 312 and 308 converge, represents the capture of dynamic web content with user interaction. Here, the user 132 elects to capture dynamic web content inclusive of his interaction with the dynamic web content. In some instances, user interaction guides or even generates the dynamic web content. The user 132 plays an online video game, for example, and controls the actions of an avatar within the game. Each interaction the user 132 makes controls how the game develops moving forward. As another example, the user 132 interacts with one portion of a webpage while a video advertisement plays within a window located at another portion of the webpage.

In some instances, web content selected for capture does not fall solely within any specific category described with respect to the four vertices 302, 306, 310, 314 of the square 300. Instead, the web content is a hybridization of the described categories or includes content not described. Such web content can also be captured by the capturing server 102 and is represented by the shaded area 318 within the square 300.

To capture web content, a capturing session which allows the client device 120 to remotely control a web browsing session between the capturing server 102 and the web server 122 can be initiated in a number of ways. In a first type of embodiment, the active web browsing session between the capturing server 102 and the web server 122 is established by transferring an active web browsing session between the client device 120 and the web server 122 to the capturing server 102. For example, the active web browsing session between the client device 120 and the web server 122 is transferred to the capturing server 102 by initiating a capture mode at the client device 120. Initiating a capture mode means to prepare, initialize, or make the capturing system 100 ready for the capture of web content from the web server 122, and/or from other web servers, by the capturing server 102. Alternatively, in a second type of embodiment, the client device 120 does not transfer, but rather initiates the active web browsing session between the capturing server 102 and the web server 122 to initiate a capture mode and begin the capture of web content from the web server 122 and/or from other web servers.

In an embodiment of the first type, the user 132 of the client device 120 clicks a representation of a button provided by a browser extension and displayed in a web browser executing on the client device 120 to transfer the active web browsing session from the client device 120 to the capturing server 102. In doing so, the client device 120 establishes the active link 128. The capturing server 102, in turn, establishes the active link 130 to the web server 122 the client device 120 was browsing.

In transferring the web browsing session for a particular embodiment, the client device 120 sends the capturing server 102 the URL of the web server 122. In further embodiments, the client device 120 sends data in addition to the URL to allow the capturing server 102 to more closely replicate the web browsing session being transferred. If the user 132 is logged into an account on the web server 122, such as a bank account or a social networking account, for example, then the client device 120 sends the capturing server 102 additional information, including credentials the client device 120 has accumulated during its web browsing session with the web server 122. In this way, the session is transferred to the capturing server 102 without being interrupted.

In some instances, the web server 122 is spoofed into thinking it is still participating in a web browsing session with the client device 120. In other instances, however, as when the web server 122 uses ingress and/or egress filtering, the web server 122 recognizes that packets are no longer being received from and/or being sent to the same address (i.e., the address of the client device 120). The user 132 then repeats the login procedure for his account from within the transferred web browsing session between the capturing server 102 and the web server 122.

For a number of embodiments, session cookies maintained by a web browser executing on the client device 120 during a web browsing session are transferred to the capturing server 102 with the web browsing session. For the resulting web browsing session established between the capturing server 102 and the web server 122, a web browser now executing on the capturing server 102 is in possession of the session cookies which were being previously maintained by the web browser executing on the client device 120.

Clicking the button provided by the browser extension also launches the RCP on the client device 120, allowing the client device 120 to direct a web browser executing on the capturing server 102 to specific web content hosted by the web server 122. While the client device 120 is running the RCP, the user 132 sees displayed on a screen of the client device 120 a representation of the web browser executing on the capturing server 102 within a graphical interface executing on the client device 120.

In an embodiment of the second type, regardless of web browsing sessions, if any, that are active at the client device 120, the user 132 double clicks an icon displayed on a desktop of an operating system running on the client device 120 to initiate the capture mode. The client device 120 launches a default RCP application or displays a prompt to select one, if one is not already executing, establishes the active link 128, and launches the RCP application. When connecting with the capturing server 102, the user 132 receives a login prompt from the capturing server 102 to verify the user 132 is a subscriber. The capturing server 102 establishes the active link 130 and a web browsing session, supported by the active link 130, with the web server 122 as the user 132 uses the RCP to direct the capturing server 102 to web content hosted by the web server 122.

In another embodiment, a web browser is executing on the client device 120, or the user 132 launches one. The user 132 enters an IP address or a domain name into the browser to navigate to the capturing server 102 and initiate the capture mode. After logging into the capturing server 102, the user 132 can use the client device 120 to direct the capturing server 102 to capture web content hosted by the web server 122 or web content hosted by other web servers. As the client device 120 directs the capturing server 102 to a web server, the capturing server 102 establishes an active link with that web server to support an active web browsing session between the capturing server 102 and the web server to capture web content the user 132 specifies.

Figure 4:
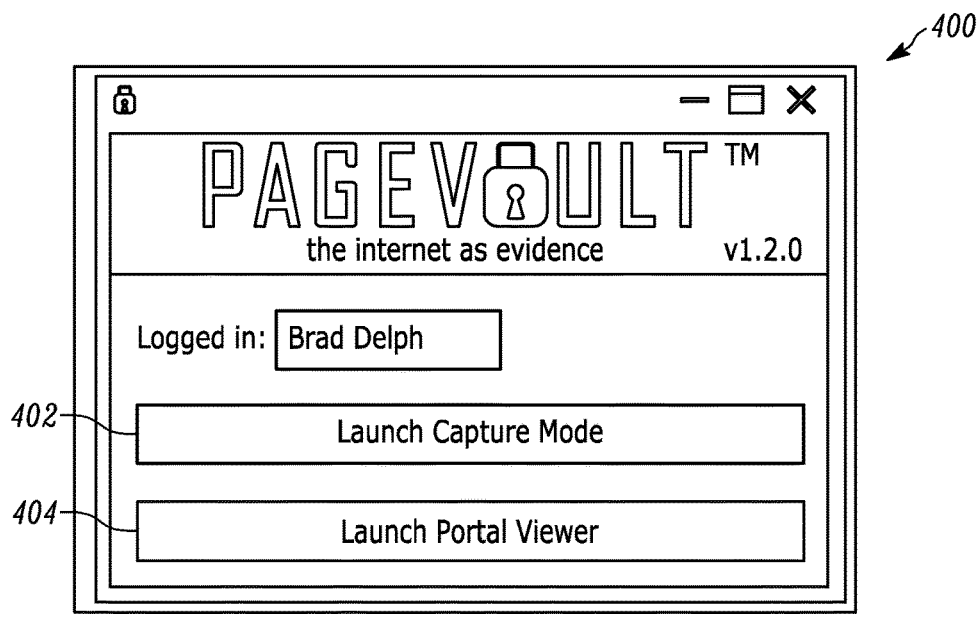
FIG. 4 shows an interactive graphic presented by a client device for initiating a capturing session, in accordance with some embodiments.

FIG. 4 shows an example of an interactive graphic 400 presented by the client device 120 for initiating a capturing session. For an embodiment, the user 132 is presented with the graphic 400 after double clicking a desktop icon to establish a connection with the capturing server 102. The interactive graphic 400 includes buttons 402 and 404. The user 132 clicks the button 402 to launch a capture mode and transition into a capturing session as described above. Alternatively, the user 132 clicks the button 404 to view, manage, or otherwise access captures made previously with the capturing system 100. Upon entering the correct credentials for authorization purposes, the user 132 logs into the capturing server 102 or another electronic computing device that provides the user 132 with access to previously captured web content stored using the non-volatile storage 116.

Figure 5:
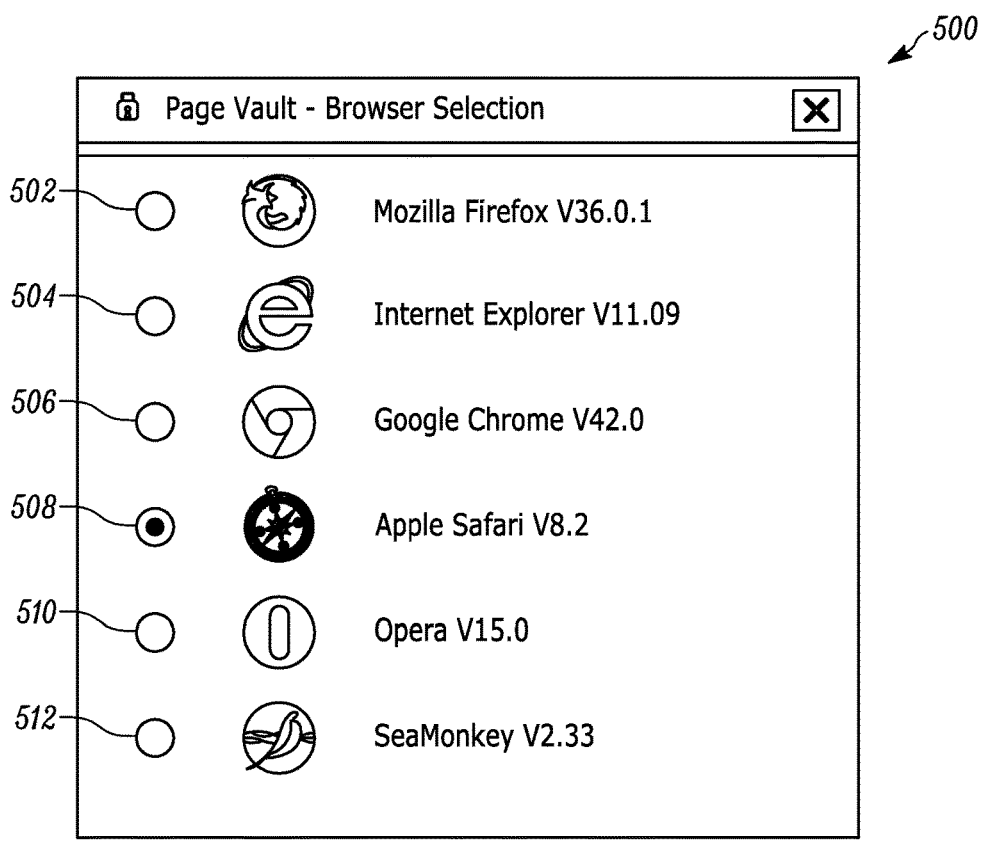
FIG. 5 shows an interactive graphic presented by a client device for selecting a web browser to capture web content, in accordance with some embodiments.

For some embodiments, the client device 120 presents the user 132 with an option to select a web browser to execute on the capturing server 102 when the user 132 launches the capture mode. FIG. 5 shows an interactive graphic 500 offering six web browsers from which to choose. By clicking one of six radio buttons 502, 504, 506, 508, 510, 512, the user 132 selects the web browser paired with the clicked button. The capturing server 102 receives an indication of the web browser selected over the active link 128 and responsively launches the selected web browser.

For instance, by clicking the radio button 508, as shown, the user 132 selects the Apple Safari web browser for use by the capturing server 102 in capturing selected web content. For the third capture mechanism, this choice is independent of any web browser executing on the client device 120. The client device 120 can be executing the Mozilla Firefox web browser, for example, to remotely control the web browsing session between the capturing server 102 executing the Apple Safari web browser and the web server 122. When the capturing server 102 captures selected web content as one or more images, the web content is captured as it appears loaded into the Apple Safari web browser, or any other web browser the user chooses to execute on the capturing server 102.

Web content hosted by the web server 122 can include data that allows for a plurality of presentation formats. These presentation formats are associated with different web browsers and/or operating systems that the capturing server 102 might use. Some webpages are designed to display web content differently depending upon a device and/or browser used to display the content. Other webpages, independent of their design, appear differently as a consequence of a device, an operating system, and/or a web browser used to display them. For example, different cascading style sheets (CSSs) might be used for different web browsers, or CSS code might be hidden from older web browsers. Also, different web browsers follow different sets of standards, often causing the same webpage to appear differently in each web browser, even if the web content for the webpage is not browser specific.

Because the capturing server 102 captures web content as screenshots of the web browser the capturing server 102 is executing, the captures are, at least in part, visual representations of the web content loaded in the web browser. Allowing for the selection of a specific web browser to execute on the capturing server 102 allows the user 132 a degree of control over how selected web content is captured.

While in capture mode, a subscriber 132 logged onto the client device 120 can use the capturing system 100 to capture web content as he directs the capturing server 102 to the web content. The capturing server 102 receives the web content and forwards it, or a graphical representation of it, to the client device 120 for display on the subscriber's desktop. In one embodiment, the subscriber 132 instructs the capturing server 102 (e.g., by clicking a capture button) to capture specific webpages or embedded files the subscriber 132 is viewing on his desktop. This places the capturing server 102 in a "selective capture mode." The capturing server 102 receives the capture request from the client device 120 and captures to the non-volatile storage 116 the specific web content indicated in the request. For a further embodiment, a "one-click" capture mode allows the subscriber 132 to execute a capture with every click of the capture button. Each capture is executed using the same settings, for example, the same case name and number, until the subscriber 132 changes the settings. If no settings are specified, default settings are used.

In another embodiment, the subscriber instructs the capturing server 102 to capture all web content for a web browsing session or for a period of time. This places the capturing server 102 in a "capture-all mode." For example, the subscriber clicks a "capture all" button appearing on the desktop of the client device 120 to send a capture-all request to the capturing server 102. The capturing server 102, upon receiving the request, captures all the web content it navigates to, under the direction of the client device 120, until the web browsing session ends or the capturing server 102 receives a "stop capture" instruction from the client device 120.

For some embodiments, the capturing server 102 captures web content that includes a webpage and asynchronous data used to generate the webpage. Webpages with asynchronous web applications that use asynchronous JavaScript and XML (AJAX) development techniques, for example, make asynchronous data calls (requests) to the web server 122 in the background that may or may not update how the webpage is displayed. Asynchronous data is data that is accessed and/or retrieved intermittently or at irregular intervals rather than in a steady or continuous stream. For one embodiment, asynchronous data calls retrieve asynchronous data used to display additional content in the existing webpage without affecting the URL. In another embodiment, asynchronous data includes data retrieved using the JavaScript Object Notation (JSON) standard for data transmission.

Asynchronous data may also include data received from the web server 122 in response to data calls from the capturing server 102 that are not asynchronous. In this instance, the data calls are made after the webpage (or a portion of the webpage) is displayed to receive additional data for the purpose of displaying more content in the webpage without altering the URL. For additional embodiments, asynchronous data calls for a webpage result from a script being run by the webpage or from the user 132 interacting with the webpage. For example, the user 132 clicks a button within the displayed webpage.

In an embodiment, the capturing server 102 is directed by the user 132 of the client device 120 to a Facebook page. As the user 132 scrolls down the page, additional data calls are made by the capturing server 102 for asynchronous data that is used to show the additional content of the Facebook page being scrolled into view. All the data for the portion of the Facebook page the user 132 viewed, received piecewise from the web server 122 using multiple data calls, is captured by the capturing server 102. In a further embodiment, the capturing server 102 captures all the web content for the Facebook page, as if the user 132 had scrolled to the bottom of the page, independently of how far down the page the user 132 actually scrolls. For a specific embodiment, the capturing server 102 uses a timestamp for each asynchronous data call made to retrieve content for a webpage being displayed by the client device 120.

For some embodiments, the capturing server 102 applies at least one of an electronic signature, a hash function, or a time stamp to captured web content. One philosophy of use is that an application of the present teachings will meet federal, state, and local evidentiary standards for legal proceedings. Rule 901 of the Federal Rules of Evidence (FRE), for example, states that "[t]o satisfy the requirement of authenticating or identifying an item of evidence, [a proponent of the evidence] must produce [supporting] evidence sufficient to support a finding that the item [of evidence] is what the proponent claims it is." FRE 901(b)(9) goes on to state that "[supporting] evidence that satisfies the requirement is [supporting] evidence describing a process or system and showing that it produces an accurate result." Through the application of specific functions and/or procedures to capture web content, the disclosed method for capturing web content from a web server properly identifies and authenticates the captured web content for use in judicial or other types of proceedings for which proffered web content must be validated.

For one embodiment, the capturing server 102, or another component of the capturing system 100, applies an electronic signature to the captured web content. An electronic signature, as defined herein, is any means of marking the captured web content to provide an indication that the capturing server 102, or any other portion of the capturing system 100, is the origin of the captured web content. For a particular embodiment, the electronic signature is a digital signature based on a cryptographic function that includes, for example, a private and a public key, used to authenticate the captured web content to which the electronic signature is applied. In a further embodiment, the capturing server 102 uses the electronic signature to provide non-repudiation.

For another embodiment, the capturing server 102, or another component of the capturing system 100, applies a hash function to the captured web content. A hash function, as defined herein, is the application of an algorithm to the captured web content that generates a unique string of data called a hash value for the captured web content. The hash value changes if the captured web content is accidentally or intentionally changed. Thus, the hash value serves as a "digital fingerprint" for the captured web content and provides an indication of data integrity.

In a further embodiment, the capturing server 102, or another component of the capturing system 100, applies a timestamp to the captured web content. A timestamp, as defined herein, is an indication of when the web content was captured or last modified. Time-stamping the captured web content, for example, provides a "guarantee" that the captured web data was not altered since it was captured by the capturing server 102. For a particular embodiment, time-stamping is based on a public-key infrastructure (PKI). In a further embodiment, the capturing server 102 applies a timestamp to the web content at the time the web content is captured during the active web browsing session between the capturing server 102 and the web server 122.

In different embodiments, the timestamp indicates when the web content was requested, obtained, and/or captured to the non-volatile storage 116. For an active web browsing session, a timestamp can be used for each individual request for data to populate a webpage, whether those requests are directed to a single web server (e.g., web server 122) or to multiple web servers. A timestamp can also be used for each event (e.g., broken links, inaccessible servers, etc.) or action (e.g., clicks, swipes, etc.) that occurs during the active web browsing session. In other embodiments, the capturing server 102 uses additional cryptographic functions, independently or in conjunction with those specified here, to authenticate the captured web content.

For various embodiments, the capturing server 102 applies a hash function, a time stamp, and/or an electronic signature, in any combination, to web content, or any portion of the web content, the capturing server 102 is capturing. In a first example, the capturing server applies an electronic signature and a time stamp to a webpage captured from the web server 122. In a second example, the capturing server 122 applies a hash function to an html file for the webpage, an electronic signature to a footer of the webpage, and a time stamp to an embedded image in the webpage.

In other embodiments, the capturing server 102 also captures metadata for captured web content. Metadata is defined herein as data that describes or relates to captured web content. For example, metadata can specify the geographic location at which the web content was captured when the capturing system 100 includes multiple capturing servers and/or non-volatile storage locations (e.g., the Memphis capturing server was used to capture the web content). Metadata can further specify a web server from which the web content was captured using a URL or an IP address. Metadata can also specify which subscriber logged into the capturing system 100 and directed the capturing server 102 to capture the web content. For a particular embodiment, the capturing server 102 captures metadata that specifies at least one of a time for the captured web content or a URL for the captured web content. The time for the captured web content can include a date and/or a time of day.

In a first embodiment, the time indicates the time the client device 120 or the capturing server 102 requests the web content. In a second embodiment, the time indicates the time the capturing server 102 receives the requested web content. In a third embodiment, the time indicates the time the capturing server 102 captures the requested web content. For additional embodiments, the metadata includes times associated with asynchronous requests made to the web server 122 and/or the times of any other identifiable interactions occurring between the capturing server 102 and the web server 122 for which a time can be assigned.

In further embodiments, metadata captured by the capturing server 102 can include, but is not limited to, the IP address of the client device 120, the capturing server 102, the web server 122, and/or the non-volatile storage 116, the geographic location of the subscriber 132 that captured the web content, what web browser was used by the capturing server 102 to capture the web content, what RCP or web browser was used by the client device 120 to direct the capturing server 102 to the captured web content, what states existed in one or more of the web browsers used (e.g., cookies, browser history, software patches installed, etc.), and what server hosted the capturing server 102 as a virtual machine (e.g., GCP, EC2, or Azure). Metadata for captured web content might also include a "surfing" history for a web browser indicating how the web browser arrived at the captured web content or the remotely controlled actions that directed the web browser to the web server 122 and the captured web content.

For an embodiment, the capturing server 102 captures web content that includes deep web content, such as when the client device 120 directs the web server 122 to a user's bank or social networking account. In other embodiments, the web content the capturing server 102 captures is selected with a URL. For a particular embodiment, the capturing server 102 also captures expandable web content associated with the URL. Expandable web content associated with a URL is web content that is not initially displayed in a web browser upon navigating the web browser to the URL. Rather, the expandable web content is shown upon a user performing an interaction with a webpage associated with the URL.

Where an "onMouseOver" script command is coded into the HTML for a webpage specified by a URL, a user can roll over an object embedded in the webpage to reveal additional web content associated with the object. The user rolls over the object a mouse or other cursor device, and the additional web content is revealed without leaving the specified webpage. This operation is referred to as a "rollover." For different embodiments, rollovers can be allowed or blocked at a user's discretion. The effect of allowing or blocking a rollover is described in greater detail with respect to FIGS. 6A and 6B.

Figure 6A:
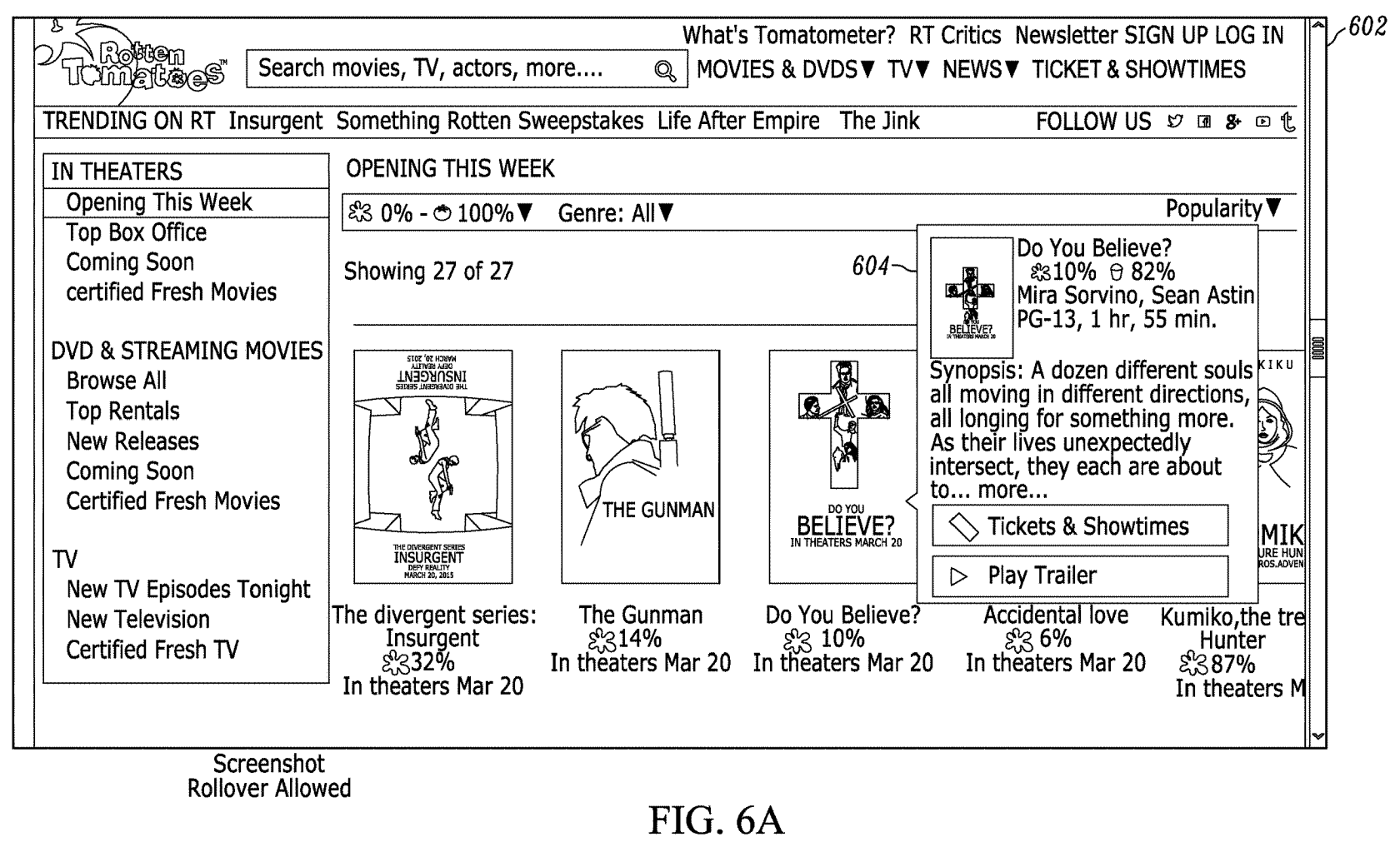
Figure 6B:
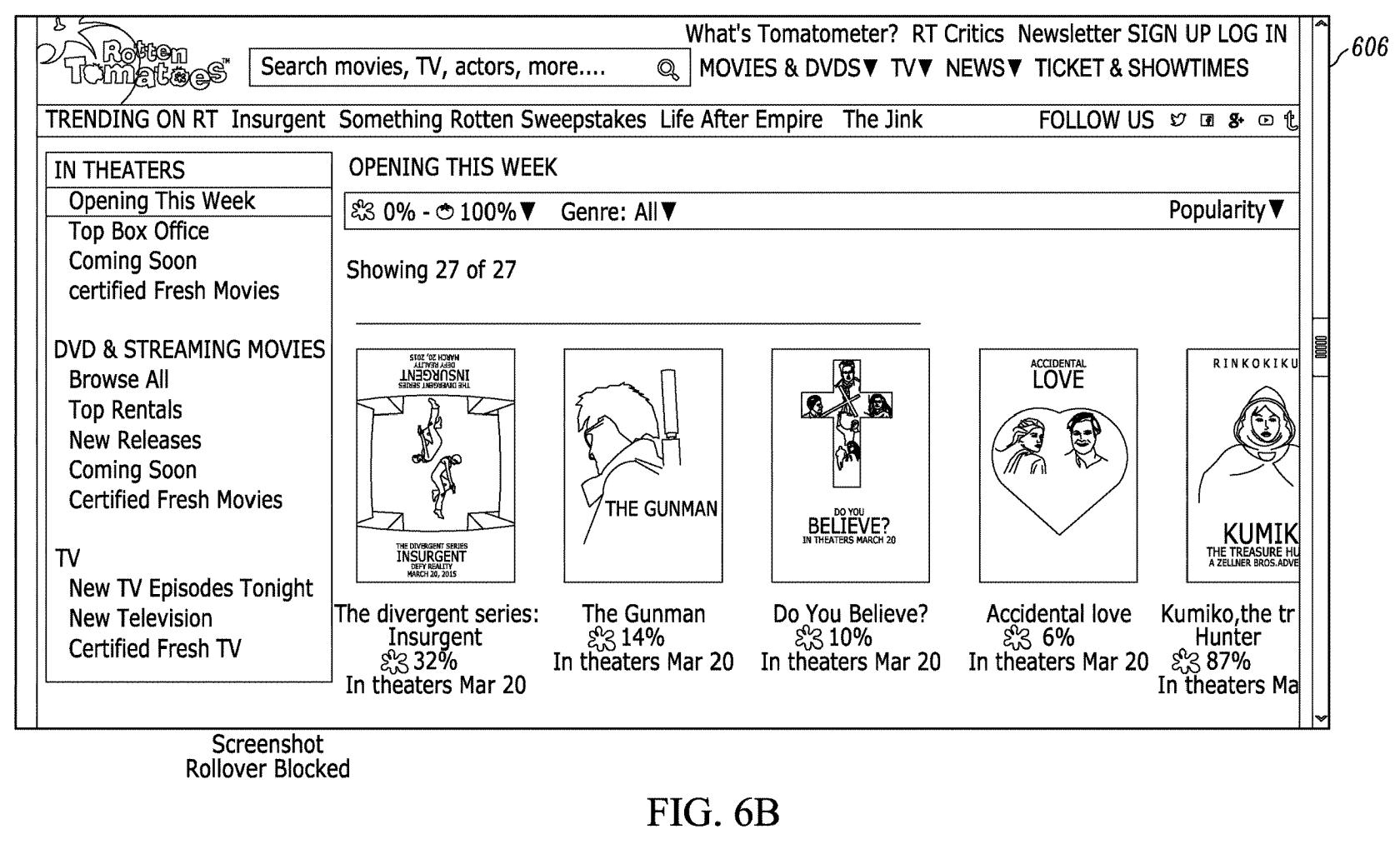

FIGS. 6A and 6B show two screenshots 602, 606 representing captured images of a webpage, Rotten Tomatoes, which provides movie reviews. The webpage includes an imbedded picture for each movie displayed. In screenshot 602, for which rollovers are allowed, a dialogue box 604 appears as the user 132 rolls his cursor device over the picture for the movie "Do You Beleive?" The open dialogue box 604 completely obscures a picture for a movie "Accidental Love" and also covers a portion of a picture for another movie in the captured screenshot 602. By blocking rollovers, as shown in the screenshot 606, the dialog box 604 does not appear and the pictures for each movie are visible in the resulting capture.

In a group of embodiments, the capturing server 102 blocks at least one interaction of the client device 120 with the web browser executing on the capturing server 102 at the moment the capturing server 102 captures selected web content as a set of images. For example, the capturing server 102 blocks rollovers as just described. Allowing the client device 120 to interact with the web browser when the capturing server 102 is capturing an image of the web browser can change the image as it is being captured.

In a second example, the capturing server 102 blocks input from a peripheral pointing device, such as a mouse, touchpad, or touchscreen, of the client device 120 at the moment of capture. This momentarily blocks the user 132 from scrolling a webpage, clicking on embedded links, or opening new tabs as a visible portion of the webpage is being captured.

In a third example, the capturing server 102 momentarily blocks input from a peripheral data input device, such as a keyboard or microphone, of the client device 120. This blocks the user 132 from entering data into a webpage at the moment of capture. In some instances, an interactive webpage alters its appearance or another webpage is loaded in response to the input of data. Blocking data input prevents this from happening as the capturing server 102 captures an image of the webpage. In different embodiments, the capturing server 102 blocks different types of interactions in different combinations so that no interaction being blocked can alter the appearance of the webpage at the moment the webpage is being captured. For an embodiment, the capturing server 102 blocks or turns off all inbound RCP messaging from the client device 120 as the capturing server 102 captures web content selected for capture by the client device 120. In a further embodiment, the inbound RCP messaging is simply dropped and not buffered.

For some embodiments, the capturing server 102 blocks the client device 120 from uploading content to the web browser executing on the capturing server 102 at any time during a capturing session. In a particular embodiment, the capturing server 102 blocks the client device 120 from uploading content to the web browser executing on the capturing server during an active web browsing session. This is a security measure by which the capturing server 102 maintains the integrity of captured web content, prevents tampering with captured web content, and/or guards against corruption of captured web content. To certify that a capture is an exact representation of web content as hosted by the web server 122, or any combination of web servers, the capturing server 102 safeguards against the client device 120 inserting or injecting any web content into a webpage that is not originally part of the webpage as hosted by the web server 122. In further embodiments, the capturing server 102 also prevents the client device 120 from introducing or changing certain types of metadata associated with a capture. For example, the client device 120 is unable to override or change a timestamp the capturing server 102 places on a captured webpage.

In capturing expandable web content for an embodiment, the capturing server 102 receives an indication of a selected webpage to capture. Upon receiving the indication from the client device 120 over the active link 128, the capturing server 102 expands expandable portions of the webpage and captures the webpage in its expanded form. In other embodiments, the capturing server 102 expands only a portion of the expandable web content before capturing the web content. For one embodiment, the capturing server 102 receives an indication from the client device 120 as to which portion of the expandable web content to expand prior to capturing the web content.

Where an "onClick" script command is coded into the HTML for the webpage, for example, the user clicks on a button or object embedded in the webpage to show additional content for the webpage without leaving a URL for the webpage. In an implementation, the capturing server 102 makes a single call (i.e., request) to the web server 122 to get all the web content associated with a URL, inclusive of the expandable web content. The expandable web content for the URL is stored in a cache memory of the capturing server 102 (e.g., the memory 106) until the user 132, using the RCP of the client device 120 during the active web browsing session, performs an action that selects the expandable web content, at which time the expandable web content is loaded and visible to the user 132.

Figure 7A:
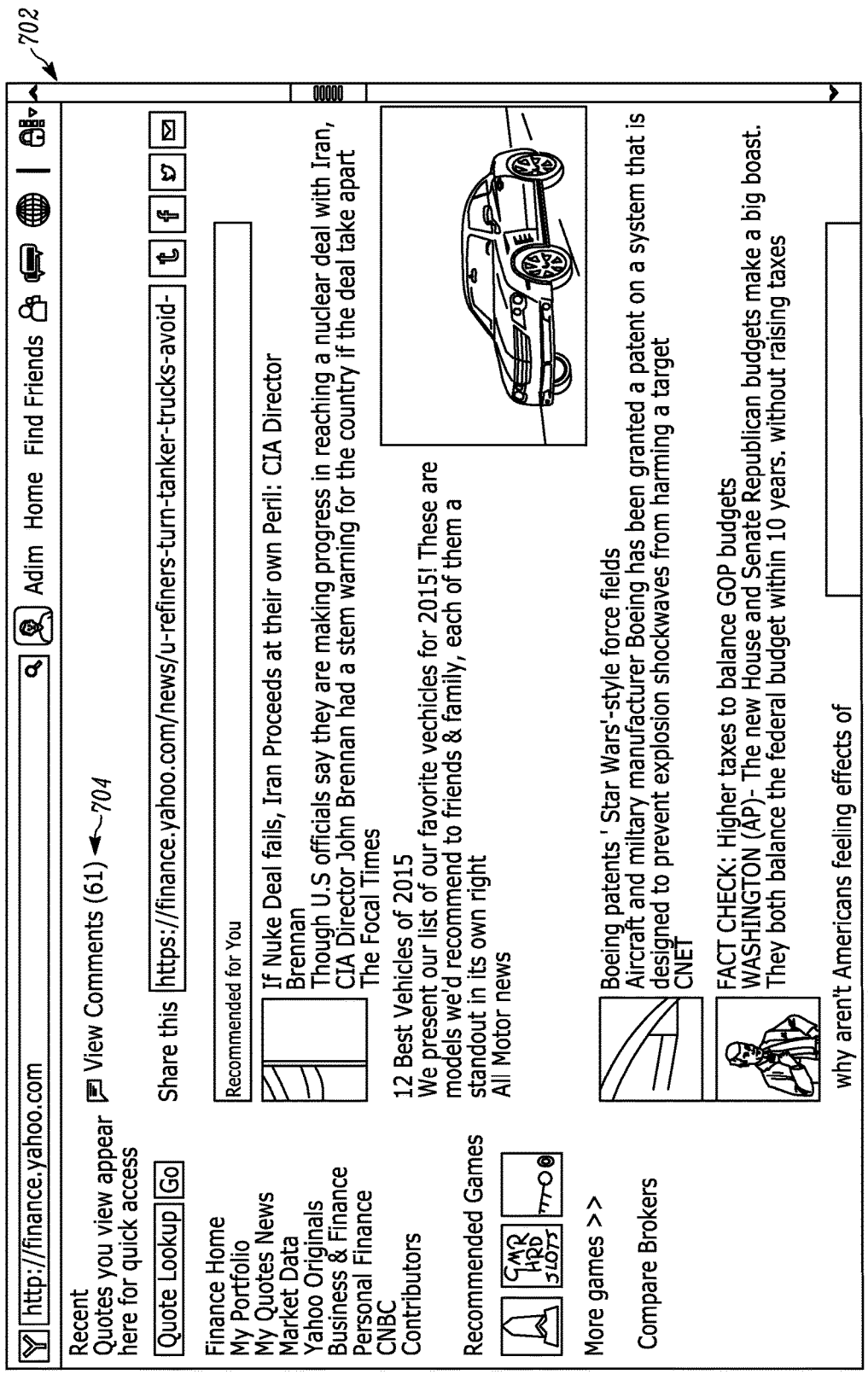
FIGS. 7A and 7B show captured images illustrating the effect of expanding web content for capture, in accordance with some embodiments.
Figure 7B:

FIGS. 7A and 7B show two screenshots 702, 706 of a webpage for a Yahoo! financial article. For each of the screenshots 702, 706, the webpage has been scrolled to the end of the article, where an expandable comment section 708 begins. In the screenshot 702, posted comments are collapsed, but a hypertext link 704 appears showing the text "View Comments (61)." If the user 132 does not expand the comment section 708 by clicking on the hypertext link 704, then the resulting capture appears as shown by the screenshot 702.

If the user 132 wishes to capture the webpage with the comment section 708 expanded, then the user 132 clicks on the hypertext link 704 using an RCP application executing on the client device 120. This expands the comment section 708 in a web browser executing on the capturing server 102, allowing the user 132 to see how the webpage will be captured. When the capturing server 102 captures an image of the web browser it is executing, it captures the webpage, or a portion of the webpage, with the comment section 708 expanded, as shown in the screenshot 706.

In one embodiment directed to capturing expanded web content, the capturing server 102 sends to the client device 120, over the active link 128, a list of expandable portions of a selected webpage. The client device 120 presents the list to the user 132, whereupon the user 132 selects from the list a set of expandable portions of the webpage to expand. The client device 120 sends an indication of the selected set of expandable portions back over the active link 128 where it is received by the capturing server 102. The capturing server 102 then expands the indicated portions of the webpage and proceeds to capture the webpage in either a fully or a partially expanded state. In another embodiment, the user 132 selects a range of web content to expand using the client device 120. The capturing server 102, upon receiving an indication of the selection, expands all the expandable web content that falls within the selected range.

Figure 8:
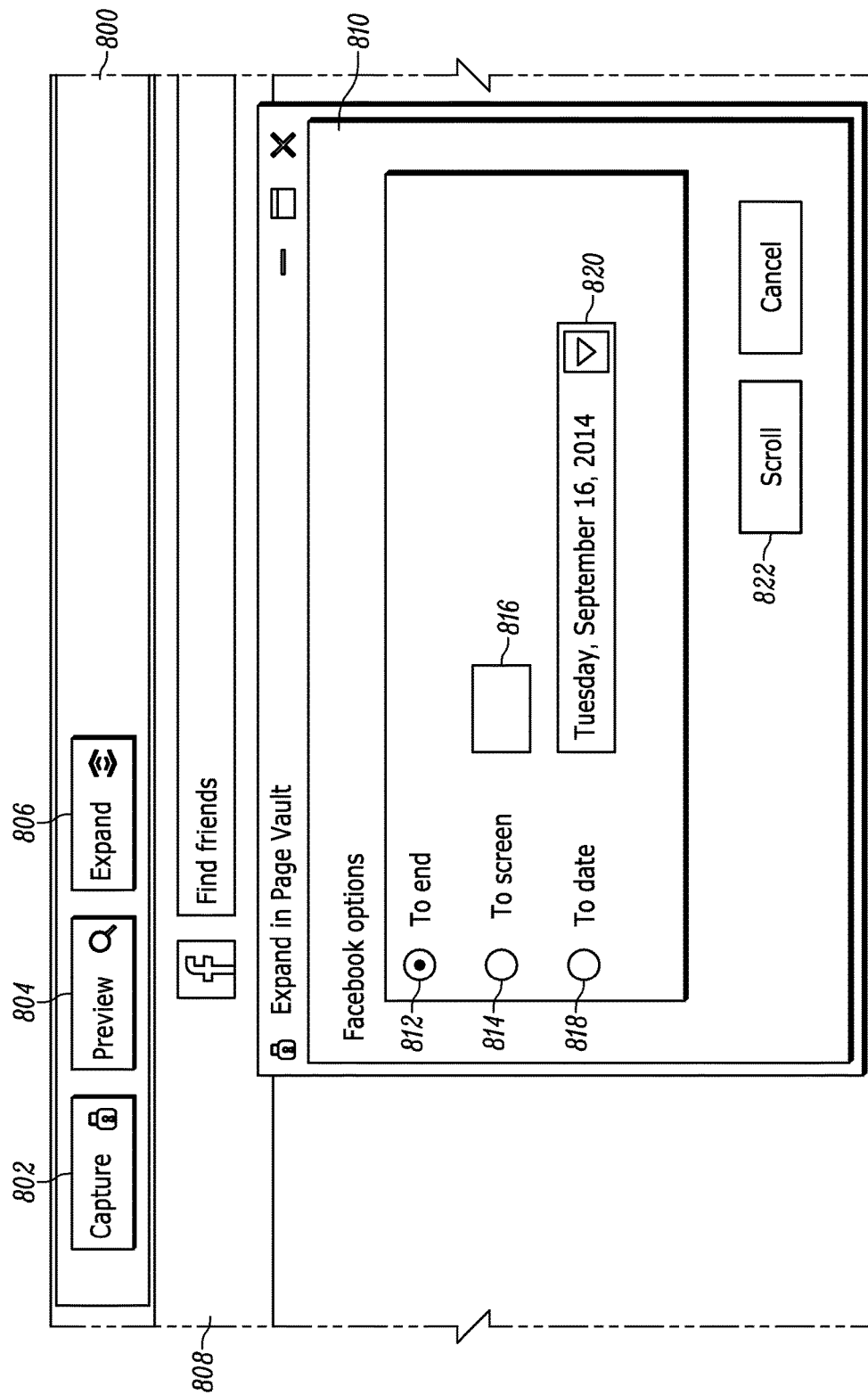
FIG. 8 shows an interactive graphic presented by a client device for capturing expanded web content, in accordance with some embodiments.

FIG. 8 shows an interactive graphic 800 presented by the client device 120 for capturing expanded web content. Using a RCP application executing on the client device 120, the client device 120 displays the interactive graphic 800 along with a webpage the user 132 of the client device 120 is viewing. As shown, the interactive graphic 800 appears as a ribbon above a Facebook webpage 808 being displayed. The interactive graphic 800 also includes three buttons: a capture button 802, a preview button 804, and an expand button 806.

For an example, the user 132 wishes to expand expandable portions of the Facebook webpage 808 he is viewing and clicks on the expand button 806. In response, the client device 120 displays a dialogue box 810. By default, a radio button 812 is selected, as shown. This setting expands all expandable content in the Facebook webpage 808, from the beginning of the webpage 808 through to the end of the webpage 808.

The user 132 can click on a radio button 814 and enter a number in a text input window 816 to expand the Facebook webpage 808 up to a screen that reflects the entered number. If the user 132 enters "3," for example, the first three screens of the Facebook webpage 808 are expanded. If the Facebook webpage 808 is less than three screens long, as determined by a zoom setting and a viewable area of the display, then the entire Facebook webpage 808 is expanded.

The user 132 can also click a radio button 818 and provide a date for a text input window 820. This expands comments, posts, and other entries made to the Facebook webpage 808 on or before, but not after, the provided date.

A scroll button 822 gives the user 132 the option of scrolling down the Facebook webpage 808 and expanding expandable web content up to the location the user 132 stops scrolling. Web content below where the user 132 stops scrolling remains unexpanded.

In further embodiments, the expansion of web content upon clicking one of the radio buttons 812, 814, 818 or the scroll button 822 begins not from the beginning of the Facebook webpage 808 but rather from a location of a cursor on the Facebook webpage 808 when the user 132 begins his selection. For example, the user 132 uses the mouse of the client device 120 to scroll down and click in the middle of a second displayed page of the Facebook webpage 808. This places the cursor in the middle of the second page. The user 132 then clicks the radio button 812 to expand all the expandable web content below the middle of the second page of the Facebook webpage 808.

After using the dialog box 810 to specify how the Facebook webpage 808 is to be expanded, the user 132 clicks the preview button 804 to show the expansion. If the user 132 is satisfied with how the expansion appears, he clicks the expand button 806. Upon clicking the expand button 806, the client device 120 communicates over the active link 128 to the capturing server 102 an indication of how the Facebook webpage 808 is to be expanded. Upon receiving the indication, the capturing server 102 expands the Facebook webpage 808 loaded in the web browser executing on the capturing server 102 in accordance with the received indication.

To capture the expanded Facebook webpage 808, the user 132 clicks the capture button 802. This sends an indication to the capturing server 102 to capture the Facebook webpage 808, or any other webpage which might be loaded. The capturing server 102 receives the indication to capture and responsively captures a set of images of the Facebook webpage 808 as it appears on the web browser executing on the capturing server 102.

For a number of embodiments, a number of screenshots used to capture a webpage loaded in the web browser executing on the capturing server 102 is proportional to the length of the loaded webpage. A set of images capturing a longer webpage can include multiple screenshots of the webpage, wherein each of the multiple screenshots captures a different portion of the webpage. In a particular embodiment, sequential screenshots of multiple screenshots used to capture a webpage overlap by an amount of overlap. Sequential screenshots are screenshots that capture neighboring or adjacent portions of a webpage, for example, a second portion of the webpage directly below or to the right of a first portion of the webpage.

In capturing as a set of images a true representation of how a webpage hosted by the web server 122 actually appears, the capturing server 102 implements measures to prevent the insertion of web content that is not originally part of the hosted webpage, as previously described. An amount of overlap is used between sequential screenshots to provide visual assurance that web content originally included in the webpage has not been omitted from the capture. Overlapping sequential screenshots are described in greater detail with reference to FIGS. 9A and 9B.

Figure 9A:
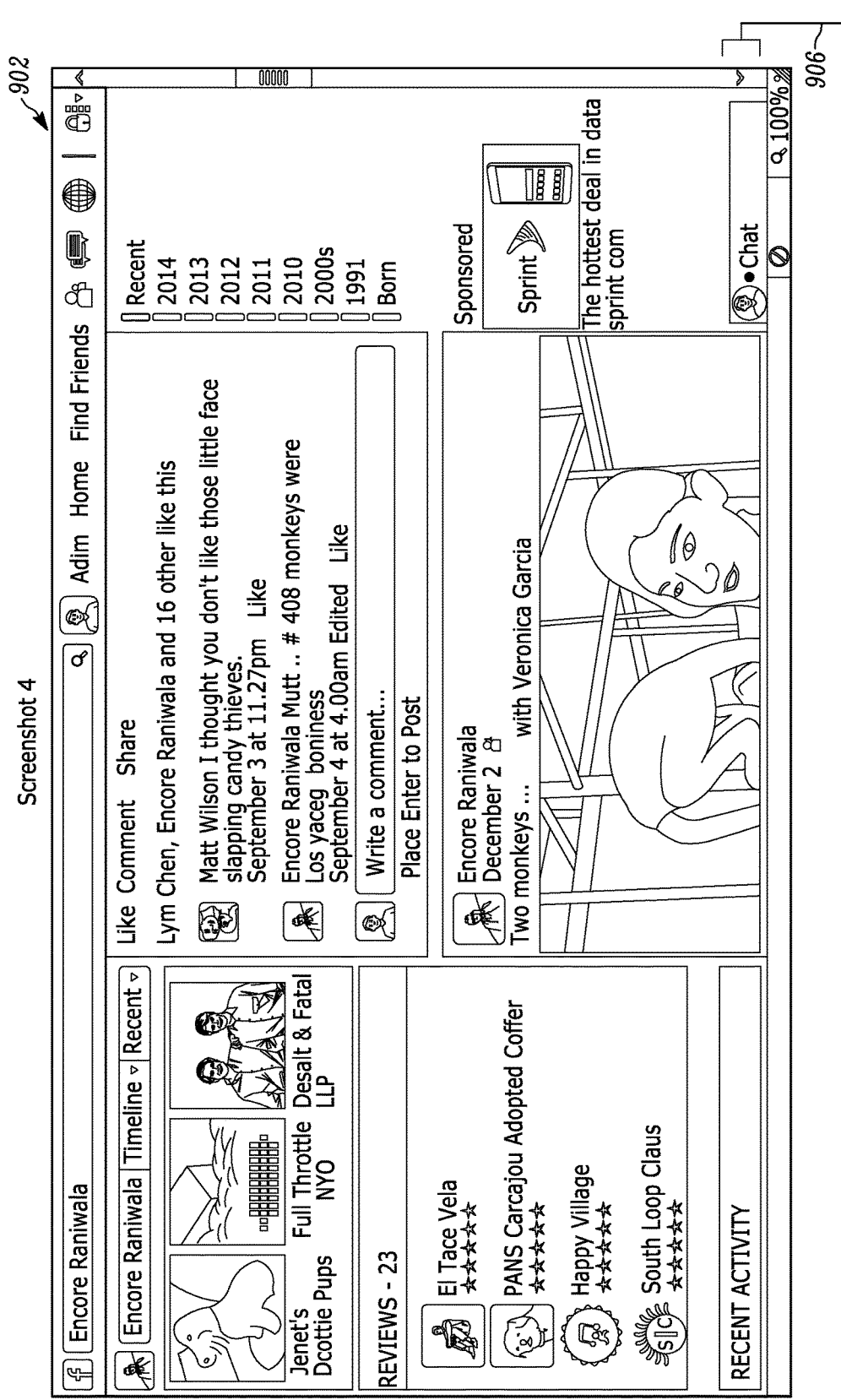
FIGS. 9A and 9B show captured images illustrating the effect of setting an amount of overlap, in accordance with some embodiments.
Figure 9B:
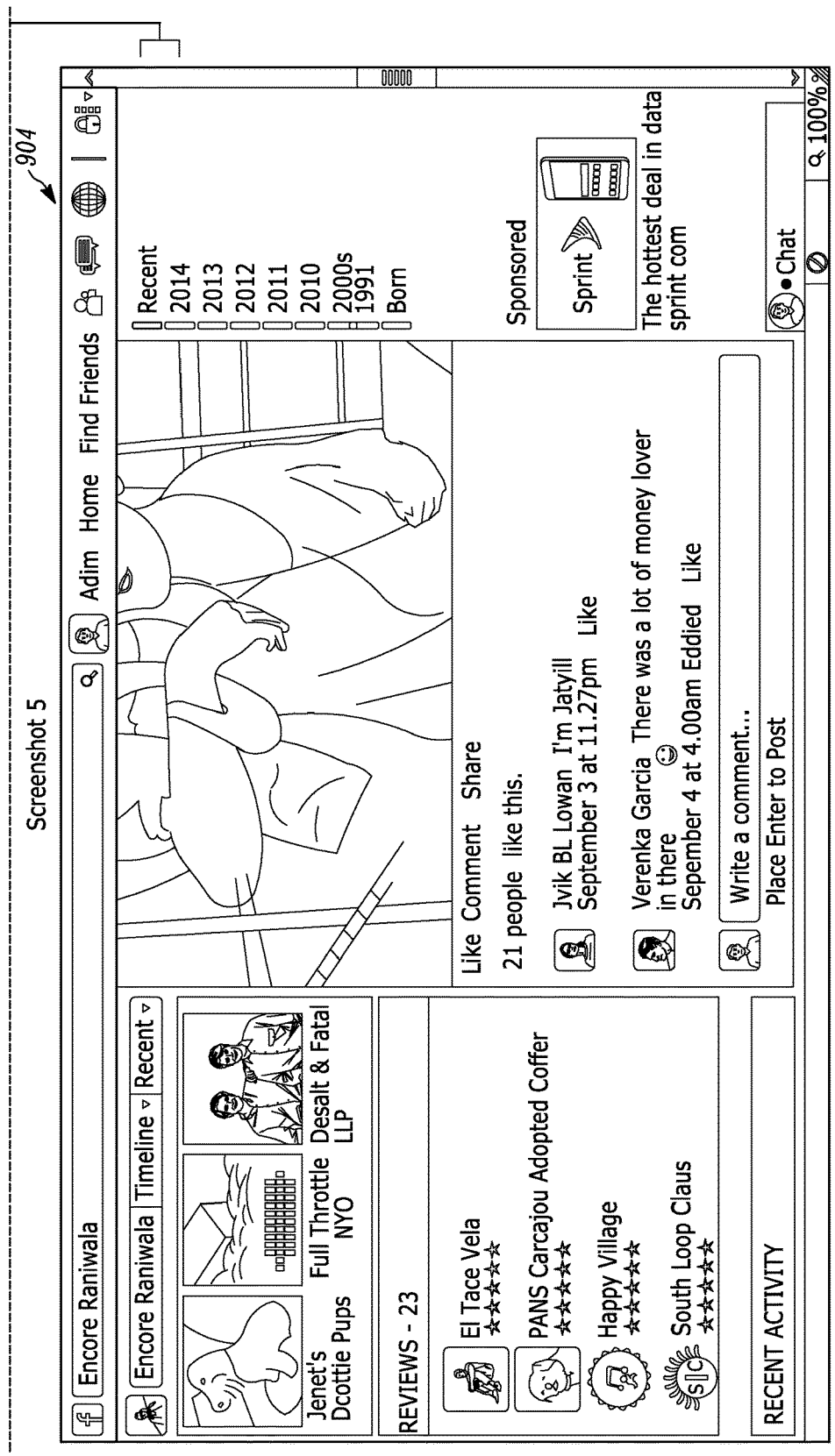

FIGS. 9A and 9B show two sequential screenshots 902, 904 of a Facebook webpage captured as a set of images. In particular, the screenshot 902 captures a fourth portion of the webpage and the screenshot 904 captures a fifth portion of the webpage immediately below the fourth portion. An amount of overlap between the two sequential screenshots 902, 904 is indicated at 906. Given the amount of overlap shown, the mouth of the young lady holding a monkey on her right arm is captured twice, once at the bottom of screenshot 902 and again at the top of screenshot 904. It is visually evident that web content is not omitted from between the screenshots 902 and 904, which could be the case if there were a gap between the screenshots 902, 904 rather than an amount of overlap 906.

In a further embodiment, the capturing server 102 receives from the client device 120 over the active link 128 an indication of a measure of overlap, wherein the measure of overlap specifies the amount of overlap. For example, the user 132 of the client device 120 specifies no overlap, in which case the sequential screenshots 902, 904 would meet flush. If the user 132 specifies a measure of overlap of a half centimeter, then the last half centimeter of the screenshot 902 and the first half centimeter of the screenshot 904 will cover the same portion of the webpage being captured. In different embodiments, the measure of overlap can be specified in different ways, inclusive of a number of pixels, in units of distance, or as a percentage of a dimension of a screenshot.

The client device 120 communicates to the capturing server 102 the indication of the measure of overlap the user 132 specifies. The capturing server 102 then loads sequential screens of a webpage being captured with the indicated measure of overlap so that sequential screenshots overlap in accordance with the user's specification. After each screenshot, the capturing server 102 pauses before capturing the next screenshot to allow time for the next screen to load. In some instances, the time for each screen to load can vary depending on specific hardware being used, an amount of data being retrieved, bandwidth, and/or network conditions.

For some embodiments, so that each screen of a webpage finishes loading before capturing that part of the webpage, that capturing server 102 applies a comparative algorithm. The capturing server 102 applies the comparative algorithm to a first portion and a second portion of a webpage selected to be captured in consecutive screenshots. The capturing server 102 then compares a second output of the comparative algorithm for the second portion to a first output of the comparative algorithm for the first portion. The capturing server 102 captures the second portion in a second screenshot after capturing the first portion in a first screenshot in response to the second output not matching the first output. Consecutive screenshots are screenshots that are captured in immediate succession in time, but may or may not capture sequential screens of a webpage. If a second loaded screen of a webpage is not captured, for example, then the screenshots that capture the first and third screens of the webpage become consecutive screenshots because the first and third screens are consecutively captured in time. The application of the comparative algorithm is described in greater detail with reference to FIGS. 10A, 10B, 10C, 11A, and 11B.

Figure 10A:
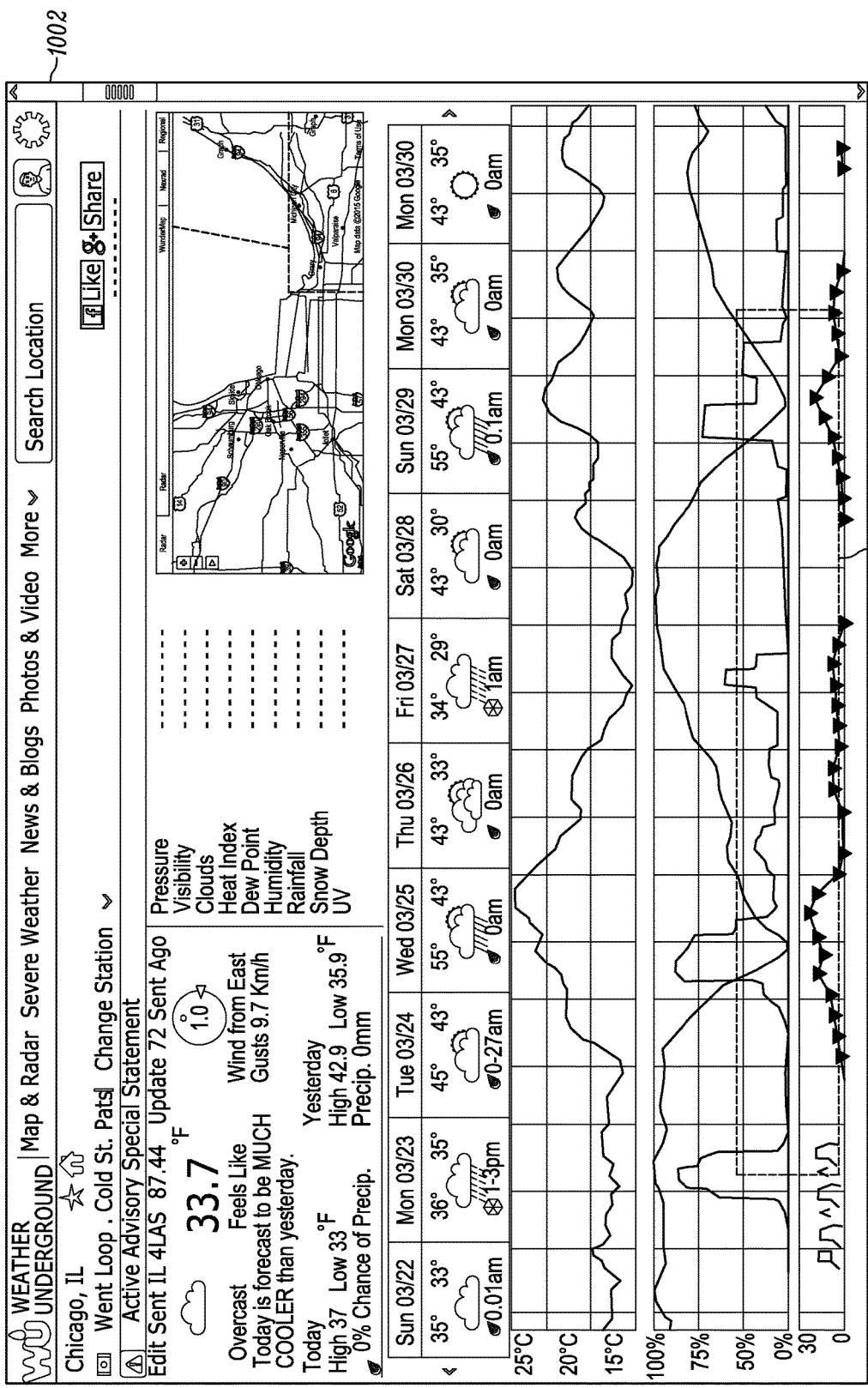
Figure 10B:
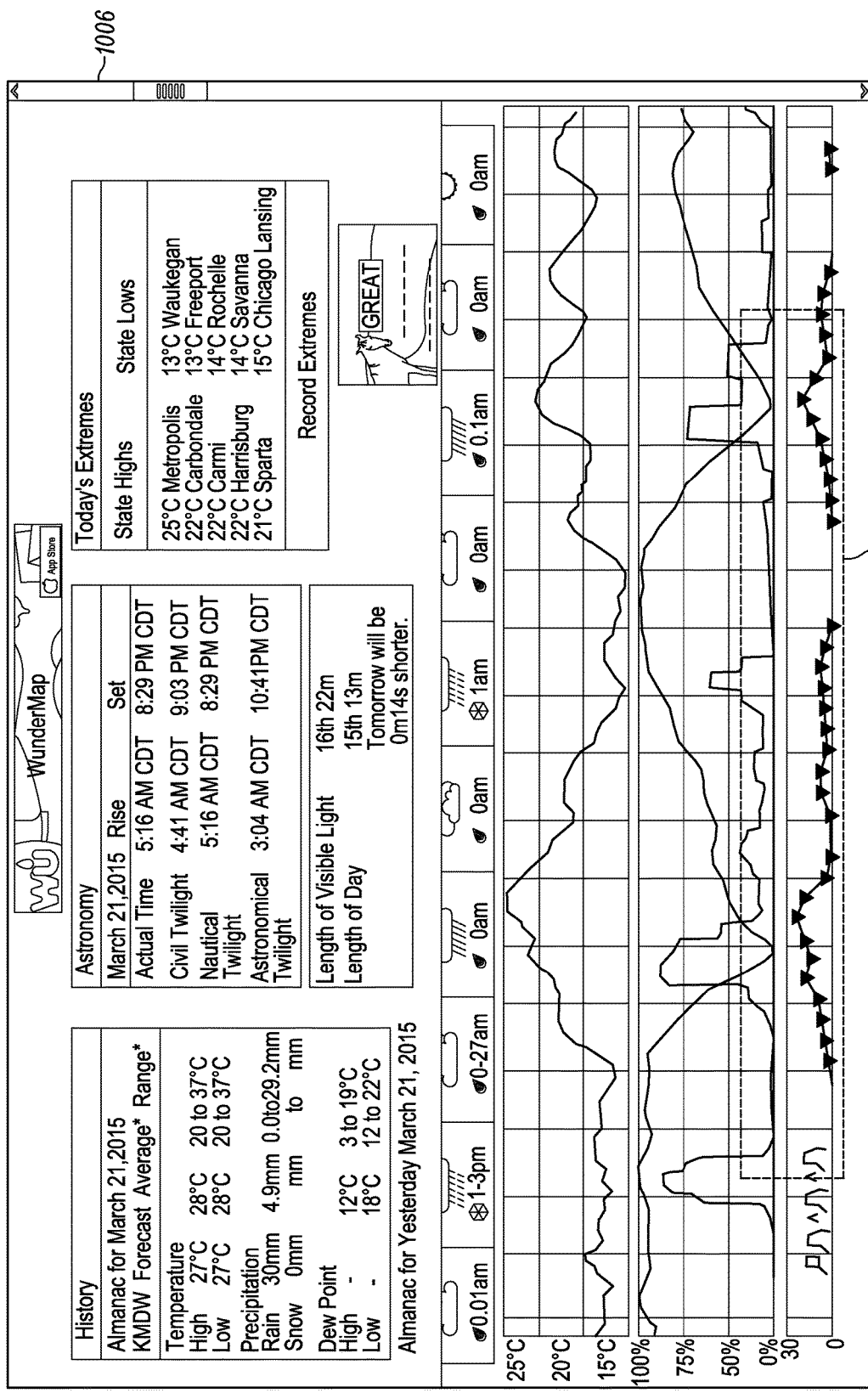
Figure 10C:
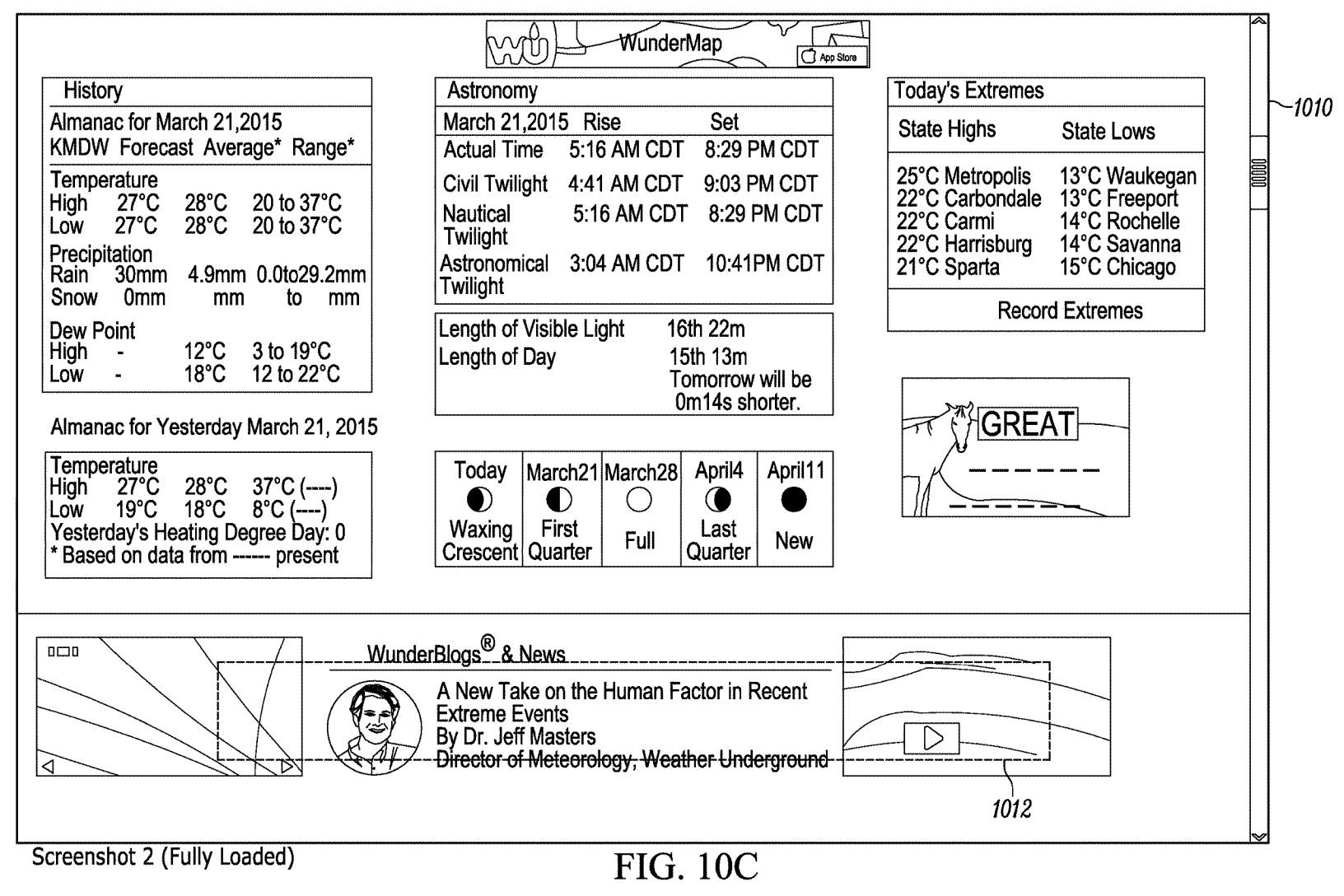

FIGS. 10A, 10B, and 10C show consecutive screenshots 1002, 1006, 1010 of a Weather Underground webpage in various states of loading. A first screen of the webpage is fully loaded and captured by the screenshot 1002. A second screen of the webpage is captured by the screenshot 1006 before it finishes loading. The second screen is captured by the screenshot 1010 after it finishes loading. A first portion of the webpage located on the first screen is indicated at 1004. A second portion of the webpage located on the second screen is indicated at 1008 and also at 1012.

The first portion of the webpage is shown at 1004 at the bottom of the first screen. The second portion of the webpage shown at 1008 and 1012 is identical in its proportions to the first portion and is located in the identical position on the second screen as the first portion is on the first screen. The first and second portions of the webpage are located at the bottom of their respective screens. This is because webpages generally load from top to bottom, making the bottom of each screen the last area to load. The first and second portions of the webpage are also wide relative to their height. This is in case any areas on the loaded webpage appear blank, such as a central region between twin columns of text. In a particular embodiment, the first and second portions of the webpage are equal in width to the webpage.

As shown in the screenshot 1006, the second screen was only partially loaded. While the upper area of the screenshot 1006 shows new content, the lower area was not yet loaded and still shows the same content as the screenshot 1002. In particular, the second portion of the webpage indicated at 1008 still shows the identical content to the first portion indicated at 1004. In performing a comparative algorithm on the first and second portions, the capturing server 102 determines that both portions show the same content, indicating that the second screen is not finished loading. The capturing server 102 responsively delays capturing the second screen.

At a later time, the capturing server 102 again compares the first and second portions. As shown in screenshot 1010, the second screen is now fully loaded. Therefore, the second portion of the webpage indicated at 1012 shows different content than the first portion indicated at 1004. In performing the comparative algorithm, the capturing server 102 determines the two portions show different content, indicating the second screen is fully loaded. The capturing server 102 responsively captures the second screen as the screenshot 1010.

For an embodiment, the capturing server 102 uses a hash function in performing its comparison of the two portions. The capturing server 102 calculates as a first output of the comparative algorithm a first hash value for the first portion of the webpage. The capturing server 102 then calculates as a second output of the comparative algorithm a second hash value for the second portion of the webpage. In determining if the second screen is loaded, the capturing server 102 compares the second output to the first output.

Figure 11A:
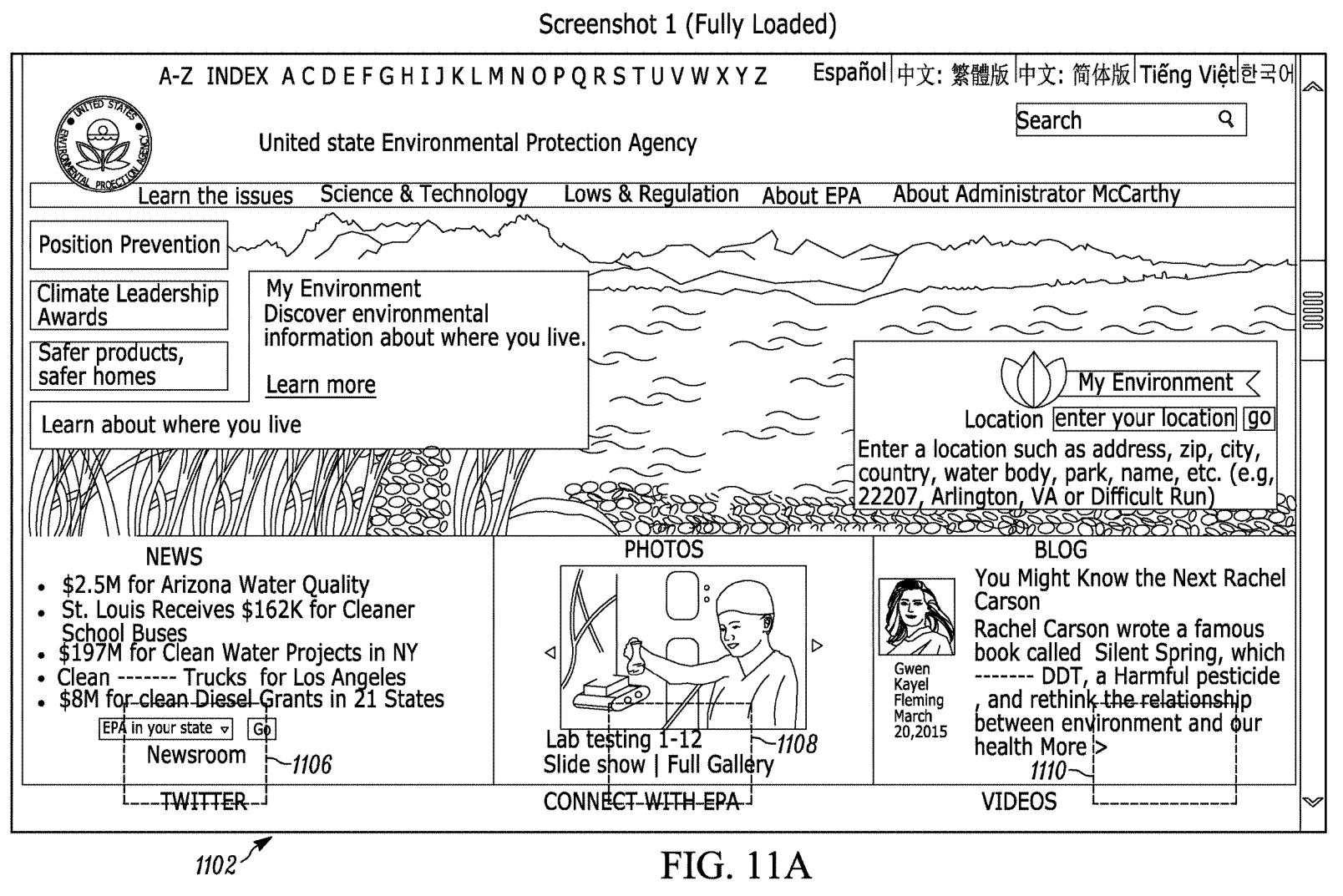
Figure 11B:
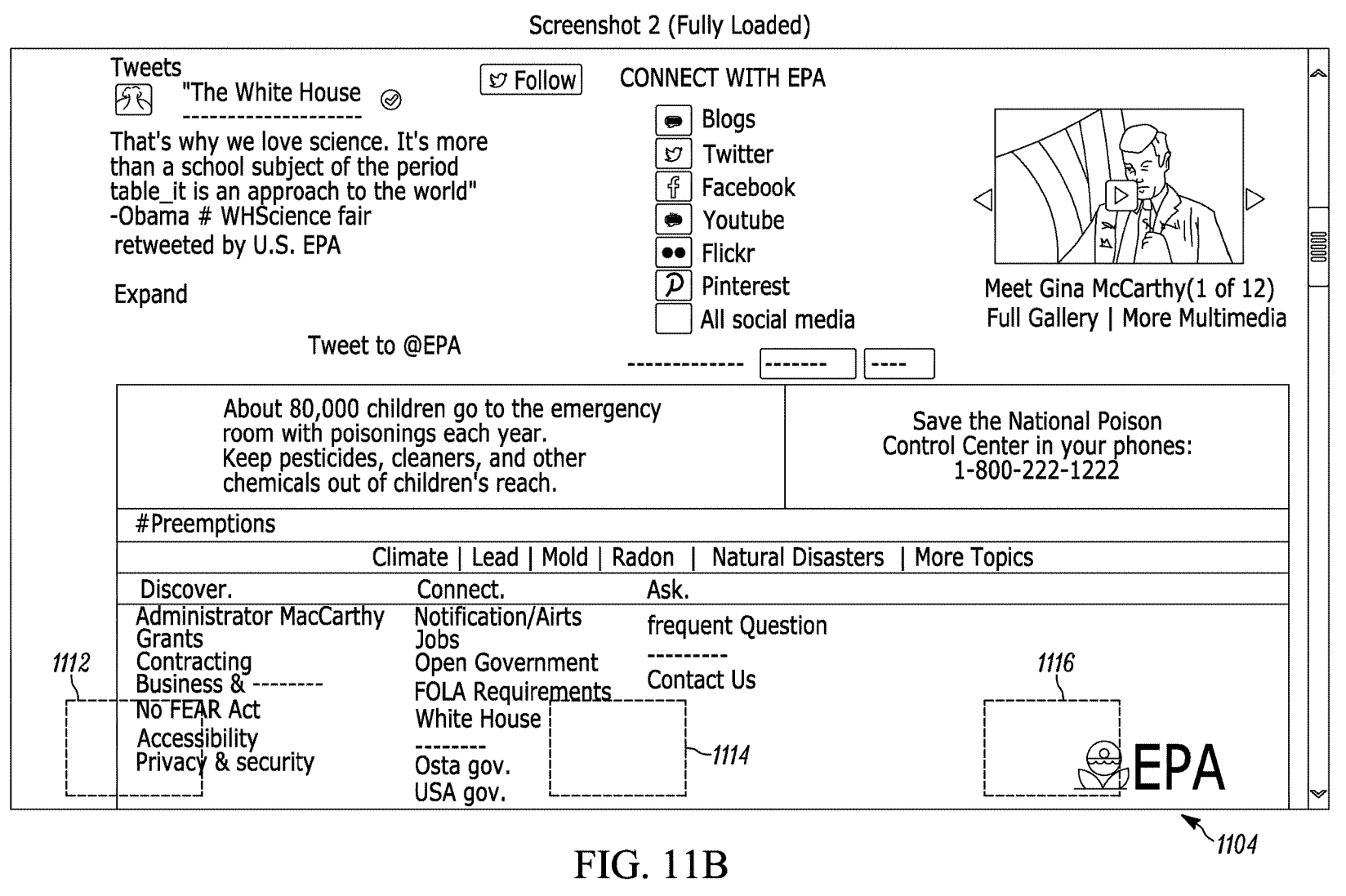

The capturing server 102 can also compare multiple portions of a webpage for each of consecutive screens against one another to determine if a latter screen is fully loaded. FIGS. 11A and 11B show two consecutive screenshots 1102, 1104 of the Environmental Protection Agency's (EPA's) webpage. The screenshot 1102 is of a first screen, and the screenshot 1104 is of a second screen. For the first screen, first, second, and third portions of the EPA's webpage are indicated at 1106, 1108, and 1110, respectively. For the second screen, fourth fifth, and sixth portions of the EPA's webpage are indicated at 1112, 1114, and 1116, respectively.

Having three portions for comparison at the bottom of each screen accommodates different ways webpages can be formatted for display. If a webpage loads with a low zoom setting on a wide-screen display, for example, margins shown on either side of any screen are large. Even with fully loaded screens, the outside portions 1106, 1110, 1112, 1116 will all show the same content if, for instance, margins are solid white. In this case, the centrally located portion 1114 will still show different content than the portion 1108 when a comparison is made, indicating the second screen is fully loaded.

In another example, a webpage is formatted into two columns, and a central region of the webpage between the columns, where portions 1108 and 1114 are located, is formatted to be white. Both the central portions 1108, 1114 will show the same content when the first and second screens are fully loaded. The outside portions 1106, 1110, 1112, 1116, however, will show different content when compared, indicating that the second screen is fully loaded.

For an embodiment in which the capturing server 102 compares multiple pairs of portions between consecutive screens, the capturing server 102 determines a latter of the consecutive screens is loaded when the capturing server 102 determines any one pair of portions has different content loaded for each portion of the pair. For another embodiment, to determine if a screen is fully loaded, the capturing server 102 compares the entire screen against a previous screen.

In some embodiments, the capturing server 102 facilitates the loading of a webpage by scanning the webpage to initiate the loading of objects embedded in the webpage prior to capturing the webpage. This method is useful when a longer webpage cannot be loaded to fit a single screen of a web browser. In some instances, content appearing beyond the first screen is not loaded until the web browser is scrolled down to the screens on which the content appears.

When the capturing server 102 receives from the client device 120 an indication to capture the Weather Underground webpage shown in FIGS. 10A, 10B, and 10C, for example, the capturing server 102 loads the webpage into the web browser the capturing server 102 is executing.

Because capturing the webpage as a set of images requires two screenshots, the capturing server 102 scans the entire webpage before capturing the first screenshot. In particular, the capturing server 102 scans the second screen before capturing the first screen so that the second screen will proceed to load in its entirety as the capturing server 102 captures the first screen as a first screenshot.

In addition to capturing web content in real time, the capturing server 102 can also schedule web content for later capture in some embodiments. Particularly, the capturing server 102 receives schedule information, for the scheduled capture of additional web content, from the client device 120 over the active link 128. At a later time, after the active link 128 is taken down, the capturing server 102 receives the additional web content from the web server 122 in accordance with the schedule information. The capturing server 102 then captures the additional web content as an additional set of images.

FIG. 12 shows an interactive graphic 1200 presented by the client device 120 for scheduling captures of additional web content. The interactive graphic 1200 represents a scheduling dialogue box that the client device 120 presents to the user 132 when the client device 120 receives an indication that the user 132 wishes to schedule the capture of additional web content. The user 132, for example, captures a Facebook webpage belonging to Zachry Wells in real time on March 28. The user 132 would also like to schedule additional weekly captures of Zachry's Facebook page for a month and indicates his intention by clicking a schedule button (not shown) appearing on a desktop of the client device 120.

In response to the schedule button being clicked, the client device 120 presents the scheduling dialog box 1200 on its display. In a text input window 1202, the user 132 enters the URL for which he is scheduling captures, in this case "http://www.facebook.com/Zachry.Wells." In text input windows 1204 and 1206, the 132 user can enter credentials used by the capturing server 102 in accessing deep web content at the time of capture. In the immediate case, the user 132 enters the name "Brad Delph" in the text input window 1204 and a Facebook password for Brad Delph in the text input window 1206. Brad Delph, for example, is listed as a friend on Zachry Wells' Facebook account. Therefore, scheduled captures will show Zachry Wells' Facebook webpage as it would appear to Brad Delph logged into his Facebook account at the time of capture. If credentials are not required to access the URL specified in the text input window 1202, then the input text windows 1204 and 1206 are left blank.

The user 132 clicks on a radio button 1208 to schedule periodic captures and enters a time and date into a text input window 1210. In the immediate case, the entered date of April 4 occurs a week after March 28. In an interval section 1212 of the scheduling dialogue box 1200, the user 132 indicates the capture is to be repeated every seven days. To set a month of weekly captures, the user 132 specifies in the text input window 1214 that the capture is to be repeated four times.

To schedule non-periodic captures, the user 132 clicks on a radio button 1216, which automatically deselects the radio button 1208. This allows the user 132 to enter a custom schedule into a text input window 1218. For example, the user 132 might enter "Apr. 4, 2015 at 3:15 pm; Apr. 5, 2015 at 9:00 am; Apr. 28, 2015 at 12:00 pm; May 15, 2015 at 12:00 pm" to make captures at irregular intervals.

For some embodiments, at the time of capture, the capturing server 102 compares the web content scheduled for capture against a previous capture of the web content. For example, the capturing server 102 determines that the web content has not changed since the last capture. Accordingly, the capturing server 102 indicates, as metadata, that the web content remains the same and does not again capture the unchanged web content. For another embodiment, the capturing server 102 determines that the web content has changed since the last capture. Accordingly, the capturing server 102 captures only that portion of the web content that has changed.

In some instances, the web content selected by the client device 120 for capture is a website identifiable by a domain name, and capturing the web content includes the capturing server 102 capturing multiple webpages of the website having the domain name. In a first embodiment, an entire website identifiable by a domain name, which includes multiple webpages, is selected for capture. In a second embodiment, multiple webpages, but not all webpages, of a website identifiable by a domain name are selected for capture. In a third embodiment, only a single webpage of a website identifiable by a domain name is selected for capture.

Figure 13:
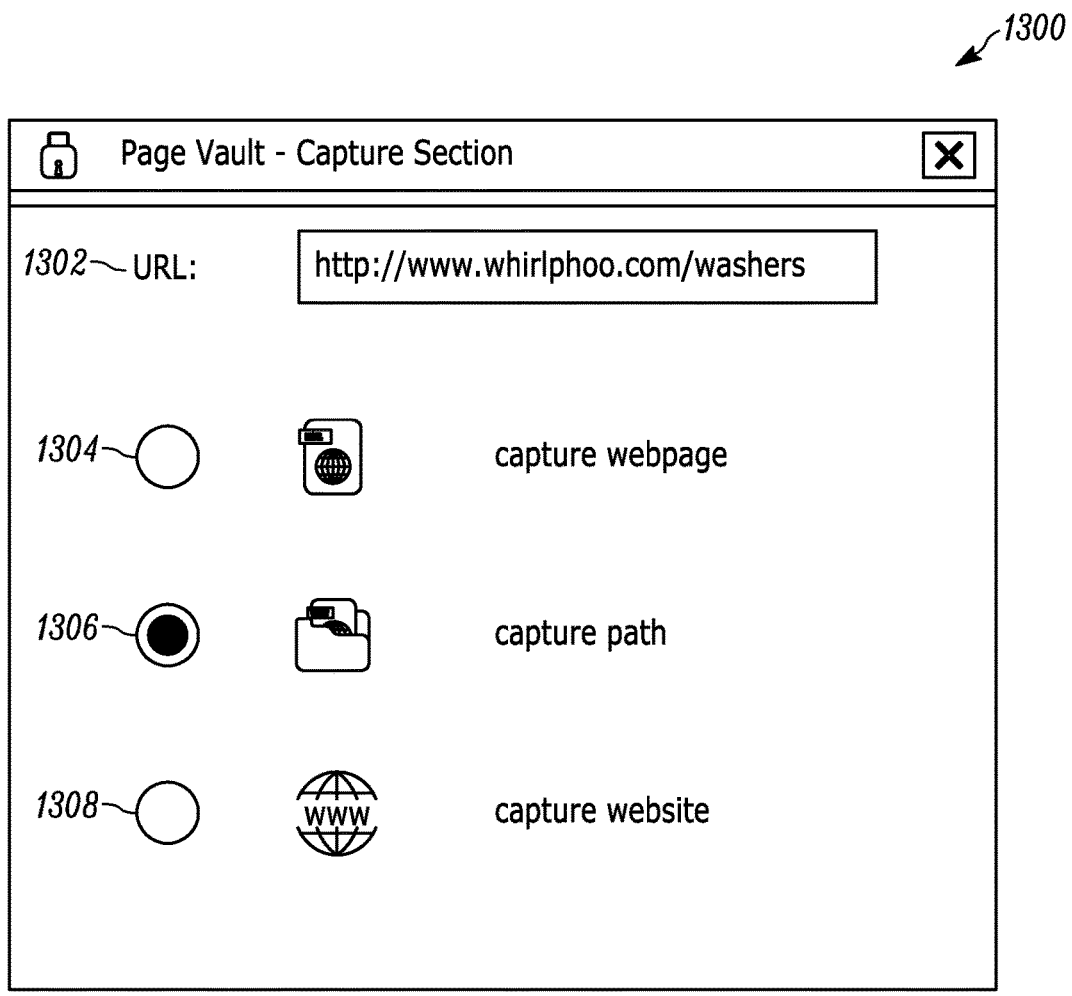
FIG. 13 shows an interactive graphic presented by a client device for selecting web content, in accordance with some embodiments.

FIG. 13 shows an interactive graphic 1300. For a particular embodiment, the client device 120 presents the graphic 1300 on its display to aid the user 132 of the client device 120 with selecting web content to capture. In a text input window 1302, the user 132 enters a URL. The URL shown is "http://www.whirlpool.com/washers," which includes the domain "whirlpol.com." By clicking on a radio button 1304, the user 132 selects only the webpage specified by the URL for capture.

By clicking on the radio button 1306, as shown, the user 132 selects for capture all the webpages included in the path given by the URL in the text input window 1302. For example, the Whirlpool website includes separate webpages for top-loading and front-loading washers specified by the URLs "http://www.whirlpool.com/washers/top_loaders/" and "http://www.whirlpool.com/washers/front_loaders," respectively. Both of the URLs are included in the path "http://www.whirlpool.com/washers" so both of the webpages are selected for capture. If the path further includes the URLs "http://www.whirlpool.com/washers/residential" and "http://www.whirlpool.com/washers/commercial," then webpages directed to residential and commercial washers would be selected for capture as well.

In an alternate embodiment, the client device 120 presents an interactive graphic (not shown) that allows the user 132 to select a subdomain for capture. For example, by entering the URL "http://www.products.whirlpool.com" and clicking on a radio button for capturing a subdomain, all webpages included in the "products" subdomain are selected for capture.

By clicking on a radio button 1308, the user 132 selects for capture the entire website specified by the domain included in the URL appearing in the text input window 1302. In this case, all webpages included in the website "http://www.whirlpool.com" are selected for capture.

In some instances, web content does not reside with a web server when the web server receives a request for the web content. For several embodiments, the client device 120 selecting web content for capture includes the client device 120 communicating a request, using RCP, directing a web server to retrieve the web content based on parameters included in the request. A web server retrieving requested web content includes the web server acquiring the requested web content from another source, such as another electronic device, and/or the web server generating the requested web content.

Figure 14:
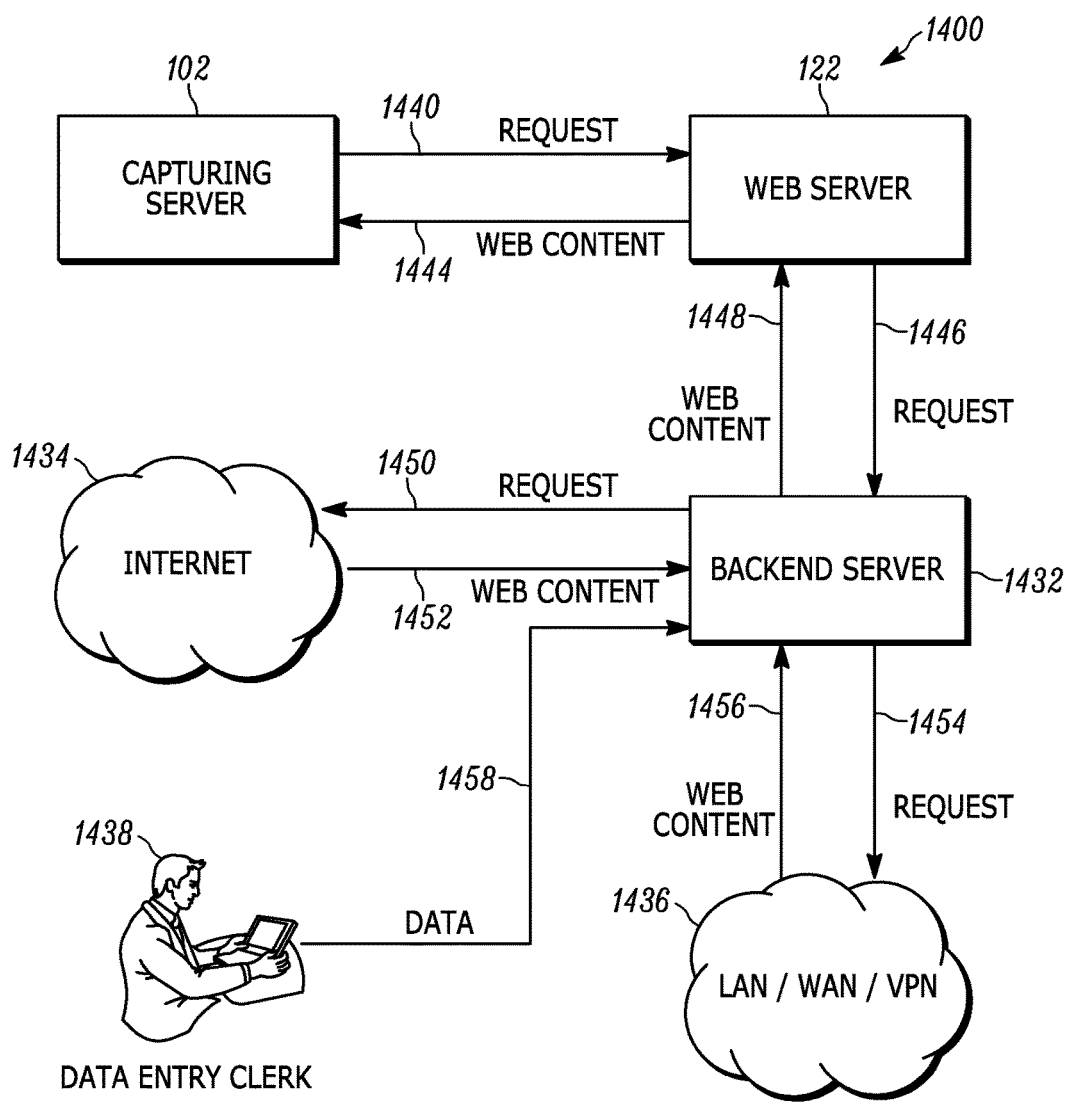
FIG. 14 shows a schematic diagram illustrating a web server retrieving web content based on a request from a client device, in accordance with some embodiments.

FIG. 14 shows a schematic diagram 1400 illustrating the web server 122 retrieving web content based on a request 1440 received from the client device 120 through the capturing server 102. The web server 122 receives the request 1440 from the capturing server 102 over the active link 130, and the web server 122 sends the requested web content 1444 to the capturing server 102 over the same active link 130. Because the requested web content does not reside, in part or in whole, with the web server 122, the web server 122 sends out a request 1446 to a backend server 1432 over a communication link established between the web server 122 and the backend server 1432. In response to the request 1446, the backend server 1432 sends web content 1448 to the web server 122 over the same communication link.

In a first example, the web server 122, belonging to a bank, receives the request 1440 for a transaction history on an account. Transaction records are stored on the backend server 1432, so the web server 122 sends the request 1446 for the records to the backend server 1432. The backend server 1432, in turn, sends the requested records 1448 back to the web server 122. The web server 122 might compile the records in a particular format before sending the transaction history 1444 to the capturing server 102 for capture.

In further embodiments, the web server 122 manages incoming requests for web content and the backend server 1432 manages outgoing requests for web content. To fulfill the request 1446, for instance, the backend server 1432 may need to retrieve web content from one or more other sources. These other sources are not necessarily limited to autonomous electronic devices. For instance, a data entry clerk 1438 uses a computer terminal communicatively coupled to the backend server 1432 to input data 1458 into the backend server 1432.

In a second example, the web server 122 is in a retail establishment and receives the request 1440 for in-stock products that match a set of parameters. The web server 122 passes the request 1446 to the backend server 1432, which communicates the request to the computer terminal used by the data entry clerk 1438. In response to the computer terminal presenting the request on a display, the data entry clerk inputs the data 1458. The data 1458 is fashioned into the web content 1448 and sent to the web server 122, which formats the web content 1448 into the web content 1444 and sends it to the capturing server 102.

As shown, the backend server 1432 is communicatively coupled to the Internet 1434 and also to a local- or wide-area-network 1436. To fulfill the request 1446 for web content, the backend server 1432 sends out to the locations 1434 and 1436, respectively, its own requests 1450 and 1454 for web content 1452 and 1456.

In a third example, the web server 122 and the backend server 1432 are maintained by a company that performs background check services. The request 1440 is a request for a private-party background check on a potential candidate for hire, John Smith. In response to receiving the request 1446 the web server 122 sends to the background server 1432, the background server 1432 makes multiple requests 1450, 1454 with remote databases. For instance, the background server 1432 sends the request 1450 through the Internet 1434 to New Jersey State Police servers and receives a record report on Mr. Smith as the web content 1452. The background server 1432 also sends the request 1454 directly to a server maintained by the New Jersey Department of Motor Vehicles and receives a driving record for Mr. Smith as the web content 1456. The information is compiled and sent as the web content 1448 to the web server 122, which formats the information into a webpage sent as the web content 1444 to the capturing server 102.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a non-user operable capturing server for capturing web content from a web server, the method comprising:
   the capturing server:
   establishing an active link between a user-operable client device and the capturing server that allows the client device to, using a remote control protocol executing on the client device, remotely control an active web browsing session, between the capturing server and the web server, to select web content;
   establishing the active web browsing session between the capturing server and the web server using a web browser executing on the capturing server;
   receiving from the client device over the active link an indication of a selected webpage, and a selection of expandable portions of the webpage;
   responsive to the selection by the client device, expanding the expandable portions of the selected webpage within the web browser executing on the capturing server;
   receiving the web content from the web server without the web content being routed through the client device;
   capturing the web content during the active web browsing session as a set of images of the web browser, wherein the set of images is captured to a non-volatile storage device, remote from the client device, for later retrieval on a future date, wherein capturing the web content as the set of images of the web browser comprises capturing the selected webpage after it has been expanded within the web browser executing on the capturing server; and
   providing image data representing the web content to the client device.

2. The method of claim 1 further comprising the capturing server receiving, over the active link from the client device, an indication of a selection of the web browser.

3. The method of claim 1 further comprising the capturing server blocking the client device from uploading content to the web browser during the active web browsing session.

4. The method of claim 1 further comprising the capturing server blocking at least one interaction of the client device with the web browser at a moment of capturing the set of images of the web browser.

5. The method of claim 1 further comprising the capturing server:
   sending to the client device over the active link a list of expandable portions of the selected webpage; and
   wherein receiving the selection of expandable portions of the webpage comprises receiving from the client device over the active link an indication of a set of expandable portions selected from the list;
   wherein expanding the_expandable portions of the selected webpage within the web browser executing on the capturing server comprises only expanding expandable portions included in the set of expandable portions selected from the list.

6. The method of claim 1, wherein the captured set of images comprises multiple screenshots of a webpage, wherein each of the multiple screenshots captures a different portion of the webpage.

7. The method of claim 6, wherein sequential screenshots of the multiple screenshots overlap by an amount of overlap.

8. The method of claim 7 further comprising the capturing server receiving, over the active link from the client device, an indication of a measure of overlap, wherein the measure of overlap specifies the amount of overlap.

9. The method of claim 1 further comprising the capturing server:
   applying a comparative algorithm to a first portion and a second portion of a webpage selected for capturing as consecutive screenshots;
   comparing a second output of the comparative algorithm for the second portion to a first output of the comparative algorithm for the first portion;
   capturing the second portion in a second screenshot after capturing the first portion in a first screenshot in response to the second output not matching the first output.

10. The method of claim 9, wherein the comparative algorithm is a hash function, and wherein comparing the second output to the first output comprises comparing a second hash value generated for the second portion of the selected website to a first hash value generated for the first portion of the selected website.

11. The method of claim 1, wherein the web content selected by the client device is a webpage, and wherein the captured set of images comprises multiple screenshots of the webpage, the method further comprising the capturing server:
   loading the webpage into the web browser executing on the capturing server; and
   scanning the webpage to initiate loading of objects embedded in the webpage prior to capturing the webpage.

12. The method of claim 1 further comprising the capturing server:
receiving from the client device schedule information;
receiving, in accordance with the schedule information, additional web content from the web server after the active link is taken down; and
capturing the additional web content as an additional set of images.

13. The method of claim 1, wherein the web content selected by the client device is a website identifiable by a domain name, and wherein capturing the web content comprises capturing multiple webpages of the website having the domain name.

14. The method of claim 1, wherein the client device selecting web content comprises the client device communicating a request directing the web server to retrieve the web content based on parameters included in the request.

15. The method of claim 1, wherein:
capturing the web content includes capturing the client device interacting with the web content; and
capturing the web content as the set of images comprises capturing the web content as a video.

16. The method of claim 1, wherein the web content is dynamic web content, and wherein capturing the web content as the set of images comprises capturing the dynamic web content as a video.

17. The method of claim 1, wherein the web content includes audio content, and wherein capturing the web content includes capturing the audio content.

18. The method of claim 1 further comprising the capturing server:
establishing a network connection between a network storage device and the capturing server, wherein the network storage device is remotely located from both the capturing server and the client device; and
sending the captured web content over the network connection for storing on the network storage device.

19. A non-user-operable capturing server configured to capture web content from a web server, the capturing server comprising:
a first wired or wireless interface configured to establish an active link with a user-operable client device;
a second wired or wireless interface configured to establish an active web browsing session with a web server;
a processor operatively coupled to the first wired or wireless interface and the second wired or wireless interface, wherein the processor is configured to:
establish the active link with the client device that allows the client device to, using a remote control protocol executing on the client device, remotely control the active web browsing session, between the capturing server and the web server, to select web content;
establish the active web browsing session with the web server using a web browser executing on the capturing server;
receive the web content from the web server without the web content being routed through the client device;
capture the web content during the active web browsing session as a set of images of the web browser, wherein the set of images is captured to a non-volatile storage device, remote from the client device, for later retrieval on a future date;
provide image data representing the web content to the client device;
receive from the client device over the active link an indication of a selected webpage, and a selection of expandable portions of the webpage; and
responsive to the selection by the client device, expand the expandable portions of the selected webpage within the web browser executing on the capturing server;
wherein capturing the web content as the set of images of the web browser comprises capturing the selected webpage after it has been expanded within the web browser executing on the capturing server.

* * * * *